US012563578B2

(12) United States Patent
Hwang et al.

(10) Patent No.: US 12,563,578 B2
(45) Date of Patent: Feb. 24, 2026

(54) METHOD AND DEVICE FOR RESERVING RESOURCES IN NR V2X

(71) Applicant: LG Electronics Inc., Seoul (KR)

(72) Inventors: Daesung Hwang, Seoul (KR); Seungmin Lee, Seoul (KR); Hanbyul Seo, Seoul (KR)

(73) Assignee: LG Electronics Inc., Seoul (KR)

( * ) Notice: Subject to any disclaimer, the term of this patent is extended or adjusted under 35 U.S.C. 154(b) by 593 days.

(21) Appl. No.: 17/922,831

(22) PCT Filed: May 7, 2021

(86) PCT No.: PCT/KR2021/005705
§ 371 (c)(1),
(2) Date: Nov. 2, 2022

(87) PCT Pub. No.: WO2021/230569
PCT Pub. Date: Nov. 18, 2021

(65) Prior Publication Data

US 2023/0164816 A1 May 25, 2023

Related U.S. Application Data

(60) Provisional application No. 63/106,333, filed on Oct. 27, 2020, provisional application No. 63/062,387, filed on Aug. 6, 2020.

(30) Foreign Application Priority Data

May 12, 2020 (KR) ........................ 10-2020-0056730

(51) Int. Cl.
*H04W 72/40* (2023.01)
*H04L 1/1812* (2023.01)
(Continued)

(52) U.S. Cl.
CPC ........... *H04W 72/40* (2023.01); *H04L 1/1816* (2013.01); *H04W 72/02* (2013.01); *H04W 72/25* (2023.01); *H04W 76/14* (2018.02); *H04W 92/18* (2013.01)

(58) Field of Classification Search
CPC ..... H04W 72/40; H04W 72/02; H04W 72/25; H04W 76/14; H04W 92/18; H04L 1/1816
See application file for complete search history.

(56) References Cited

U.S. PATENT DOCUMENTS

| 12,250,574 B2 * | 3/2025 | Hoang | ................. H04W 72/02 |
| 2020/0099479 A1 | 3/2020 | Park | |

(Continued)

OTHER PUBLICATIONS

Apple, "On Remaining Details of Resource Allocation for Mode 2," R1-2002325, Presented at 3GPP TSG RAN WG1 #100bis e-Meeting, Apr. 20-30, 2020, 5 pages.
(Continued)

*Primary Examiner* — Raj Jain
(74) *Attorney, Agent, or Firm* — Fish & Richardson P.C.

(57) ABSTRACT

According to an embodiment of the present disclosure, provided is a method in which a first device establishes sidelink communication. The method can comprise the steps of: transmitting first SCI to at least one device by means of at least one PSCCH; transmitting data and second SCI which is different from the first SCI to the at least one device by means of at least one PSSCH associated with the at least one PSCCH; determining a plurality of PSFCH resources for receiving a plurality of sidelink HARQ feedbacks associated with the data, on the basis of an index of a slot associated with the at least one PSSCH and an index of a sub-channel; receiving, from the at least one device, at least one sidelink HARQ feedback associated with the data on the basis of at least one PSFCH resource among the plurality of PSFCH resources; and determining to reselect a sidelink transmis-
(Continued)

sion resource associated with the at least one PSCCH or the at least one PSSCH, on the basis that a ratio of the total number of bits associated with ACK relative to the total number of bits associated with the plurality of sidelink HARQ feedbacks is equal to or less than a threshold value.

19 Claims, 20 Drawing Sheets

(51) Int. Cl.
| | |
|---|---|
| *H04W 72/02* | (2009.01) |
| *H04W 72/25* | (2023.01) |
| *H04W 76/14* | (2018.01) |
| *H04W 92/18* | (2009.01) |

(56) References Cited

U.S. PATENT DOCUMENTS

| | | | |
|---|---|---|---|
| 2020/0106566 A1 | 4/2020 | Yeo et al. | |
| 2020/0112400 A1 | 4/2020 | Lee et al. | |
| 2021/0250954 A1* | 8/2021 | Li | H04W 72/56 |
| 2022/0303952 A1* | 9/2022 | Hoang | H04L 5/0044 |
| 2023/0164816 A1* | 5/2023 | Hwang | H04W 72/40 |
| | | | 370/330 |

OTHER PUBLICATIONS

Samsung, "On Physical Layer Structures for NR Sidelink," R1-2002689, Presented at 3GPP TSG RAN WG1 #100bis-e Meeting e-Meeting, Apr. 20-30, 2020, 10 pages.

* cited by examiner

FIG. 3

FIG. 7
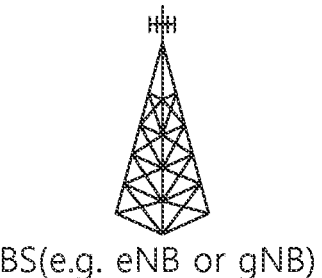
BS(e.g. eNB or gNB)
UE 1 UE 2

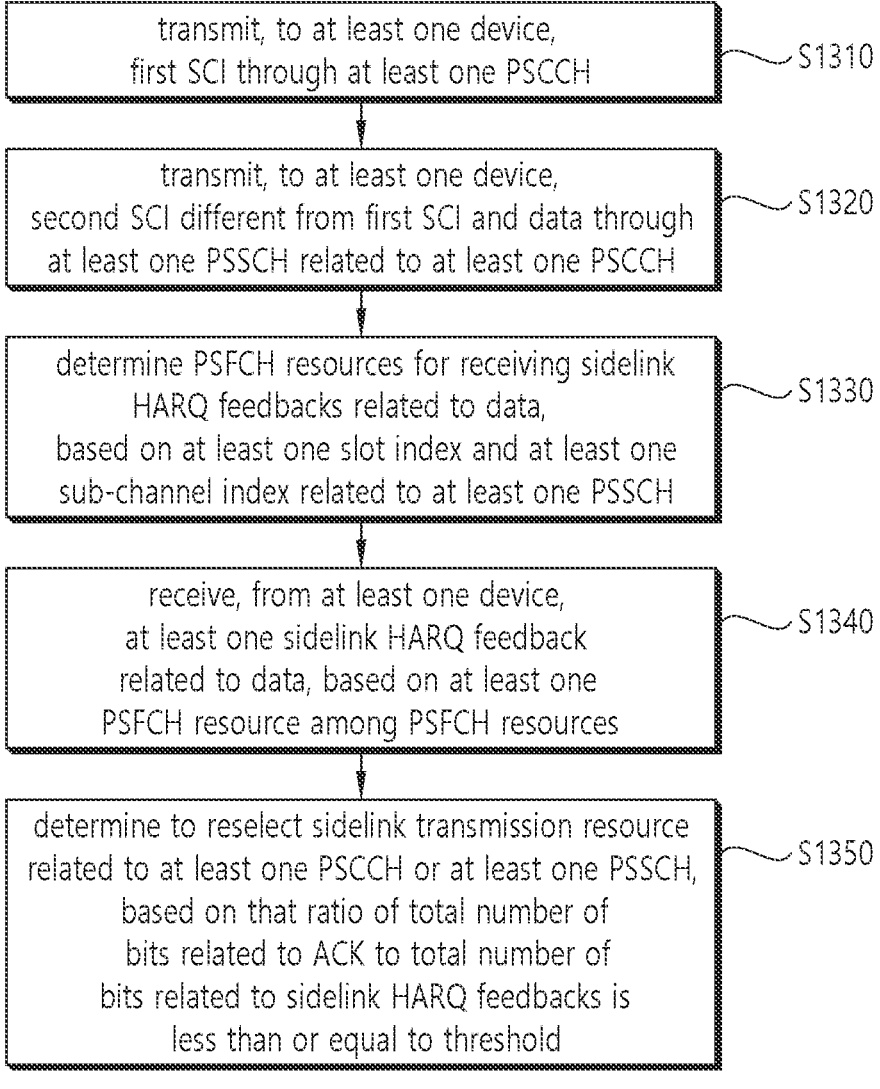

transmit, to at least one device,
first SCI through at least one PSCCH     S1310 transmit, to at least one device,
second SCI different from first SCI and data through
at least one PSSCH related to at least one PSCCH     S1320 determine PSFCH resources for receiving sidelink
HARQ feedbacks related to data,
based on at least one slot index and at least one
sub-channel index related to at least one PSSCH     S1330 receive, from at least one device,
at least one sidelink HARQ feedback
related to data, based on at least one
PSFCH resource among PSFCH resources     S1340 determine to reselect sidelink transmission resource
related to at least one PSCCH or at least one PSSCH,
based on that ratio of total number of
bits related to ACK to total number of
bits related to sidelink HARQ feedbacks is
less than or equal to threshold     S1350 receive, from first device, first SCI through PSCCH    ⌐S1410 receive, from first device,
second SCI different from first SCI
and data through PSSCH related to PSCCH    ⌐S1420 determine PSFCH resource for
transmitting PSFCH based on slot index
and sub-channel index related to PSSCH    ⌐S1430 transmit, to first device, sidelink HARQ feedback
related to data based on PSFCH resource    ⌐S1440

FIG. 18

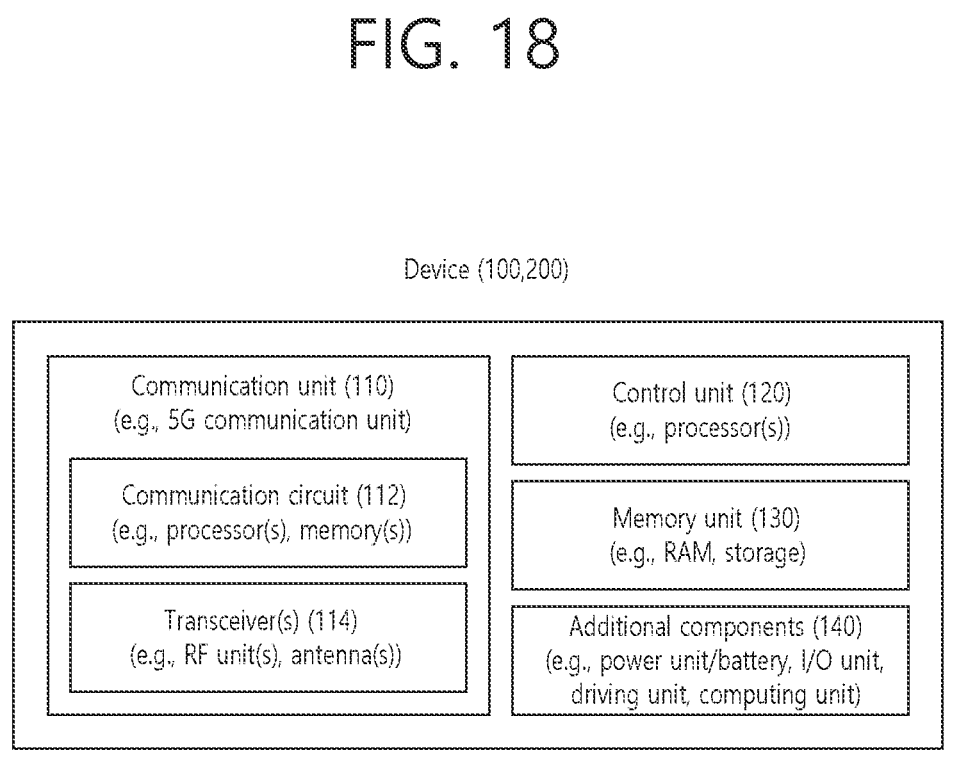

Device (100,200)

| | |
|---|---|
| Communication unit (110) (e.g., 5G communication unit) | Control unit (120) (e.g., processor(s)) |
| Communication circuit (112) (e.g., processor(s), memory(s)) | Memory unit (130) (e.g., RAM, storage) |
| Transceiver(s) (114) (e.g., RF unit(s), antenna(s)) | Additional components (140) (e.g., power unit/battery, I/O unit, driving unit, computing unit) |

METHOD AND DEVICE FOR RESERVING RESOURCES IN NR V2X

This application is a National Stage filing under 35 U.S.C. 371 of International Application No. PCT/KR2021/005705, filed on May 7, 2021, which claims the benefit of Korean Patent Application No. 10-2020-0056730, filed on May 12, 2020, U.S. Provisional Application No. 63/062,387, filed on Aug. 6, 2020, and U.S. Provisional Application No. 63/106, 333, filed on Oct. 27, 2020, which are all hereby incorporated by reference herein in their entirety.

TECHNICAL FIELD

This disclosure relates to a wireless communication system.

BACKGROUND

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic. Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

FIG. 1 is a drawing for describing V2X communication based on NR, compared to V2X communication based on RAT used before NR. The embodiment of FIG. 1 may be combined with various embodiments of the present disclosure.

Regarding V2X communication, a scheme of providing a safety service, based on a V2X message such as Basic Safety Message (BSM), Cooperative Awareness Message (CAM), and Decentralized Environmental Notification Message (DENM) is focused in the discussion on the RAT used before the NR. The V2X message may include position information, dynamic information, attribute information, or the like. For example, a UE may transmit a periodic message type CAM and/or an event triggered message type DENM to another UE.

Thereafter, regarding V2X communication, various V2X scenarios are proposed in NR. For example, the various V2X scenarios may include vehicle platooning, advanced driving, extended sensors, remote driving, or the like.

SUMMARY

A technical object of the present disclosure is to provide a sidelink (SL) communication method between devices (or UEs) and an apparatus (or UE) for performing the same.

Another technical object of the present disclosure is to provide a resource reservation method in NR V2X and an apparatus (or UE) for performing the same.

Another technical object of the present disclosure is to provide a method for reselecting a sidelink transmission resource, based on a ratio of the total number of bits related to acknowledgement (ACK) to the total number of bits related to a plurality of sidelink HARQ feedbacks expected to be received by an apparatus (or UE), and the apparatus (or UE) for performing the same in NR V2X.

Based on an embodiment of the present disclosure, a method for performing sidelink communication by a first device may be provided. The method may comprise: transmitting, to at least one device, first sidelink control information (SCI) through at least one physical sidelink control channel (PSCCH); transmitting, to the at least one device, second SCI different from the first SCI and data through at least one physical sidelink shared channel (PSSCH) related to the at least one PSCCH; determining a plurality of PSFCH resources for receiving a plurality of sidelink hybrid automatic repeat request (HARQ) feedbacks related to the data, based on at least one slot index and at least one sub-channel index related to the at least one PSSCH; receiving, from the at least one device, at least one sidelink HARQ feedback related to the data, based on at least one PSFCH resource among the plurality of PSFCH resources; and determining to reselect a sidelink transmission resource related to the at least one PSCCH or the at least one PSSCH, based on that a ratio of a total number of bits related to acknowledgement (ACK) to a total number of bits related to the plurality of sidelink HARQ feedbacks is less than or equal to a threshold.

Based on an embodiment of the present disclosure, a first device adapted to perform sidelink communication may be provided. The first device may comprise: at least one memory storing instructions; at least one transceiver; and at least one processor connected to the at least one memory and the at least one transceiver, wherein the at least one processor executes the instructions to: control the at least one transceiver to transmit, to at least one device, first sidelink control information (SCI) through at least one physical sidelink control channel (PSCCH); control the at least one transceiver to transmit, to the at least one device, second SCI different from the first SCI and data through at least one physical sidelink shared channel (PSSCH) related to the at least one PSCCH; determine a plurality of PSFCH resources for receiving a plurality of sidelink hybrid automatic repeat request (HARQ) feedbacks related to the data, based on at least one slot index and at least one sub-channel index related to the at least one PSSCH; control the at least one transceiver to receive, from the at least one device, at least one sidelink HARQ feedback related to the data, based on at least one PSFCH resource among the plurality of PSFCH resources; and determine to reselect a sidelink transmission resource related to the at least one PSCCH or the at least one PSSCH, based on that a ratio of a total number of bits related to acknowledgement (ACK) to a total number of bits related to the plurality of sidelink HARQ feedbacks is less than or equal to a threshold.

The UE can efficiently perform SL communication.

BRIEF DESCRIPTION OF THE DRAWINGS

FIG. 3 shows a radio protocol architecture, based on an embodiment of the present disclosure.

FIG. 7 shows a UE performing V2X or SL communication, based on an embodiment of the present disclosure.

FIG. 12 shows an example of continuous collision between periodic traffic of different UEs.

FIG. 13 shows a method for a first device to perform sidelink communication based on an embodiment of the present disclosure.

FIG. 18 shows another example of a wireless device, based on an embodiment of the present disclosure.

DETAILED DESCRIPTION

Figure 1:
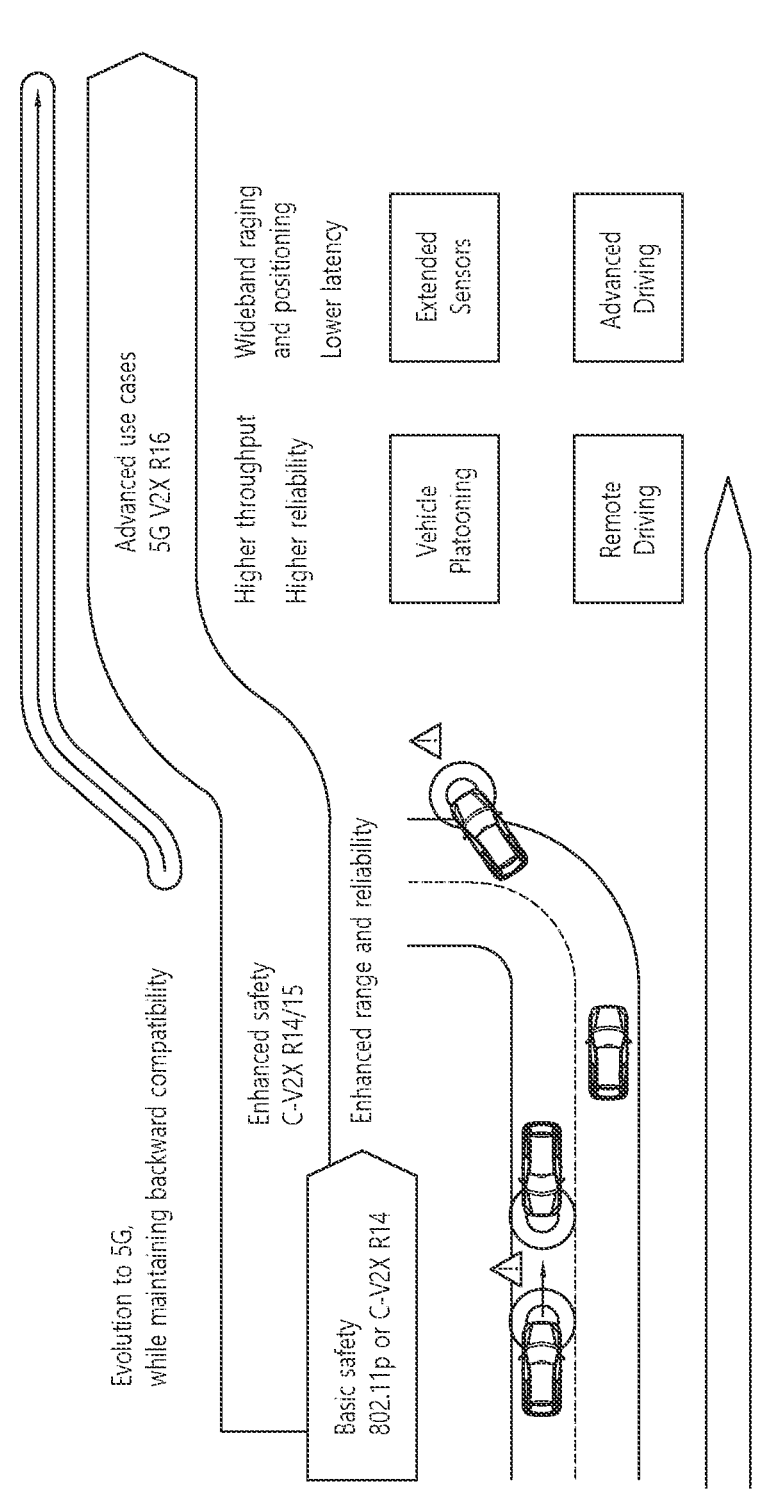
FIG. 1 is a drawing for describing V2X communication based on NR, compared to V2X communication based on RAT used before NR.

In the present specification, "A or B" may mean "only A", "only B" or "both A and B." In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or" For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (PDCCH)", it may mean that "PDCCH" is proposed as an example of the "control information". In other words, the "control information" of the present specification is not limited to "PDCCH", and "PDCCH" may be proposed as an example of the "control information". In addition, when indicated as "control information (i.e., PDCCH)", it may also mean that "PDCCH" is proposed as an example of the "control information".

A technical feature described individually in one figure in the present specification may be individually implemented, or may be simultaneously implemented.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

Figure 2:
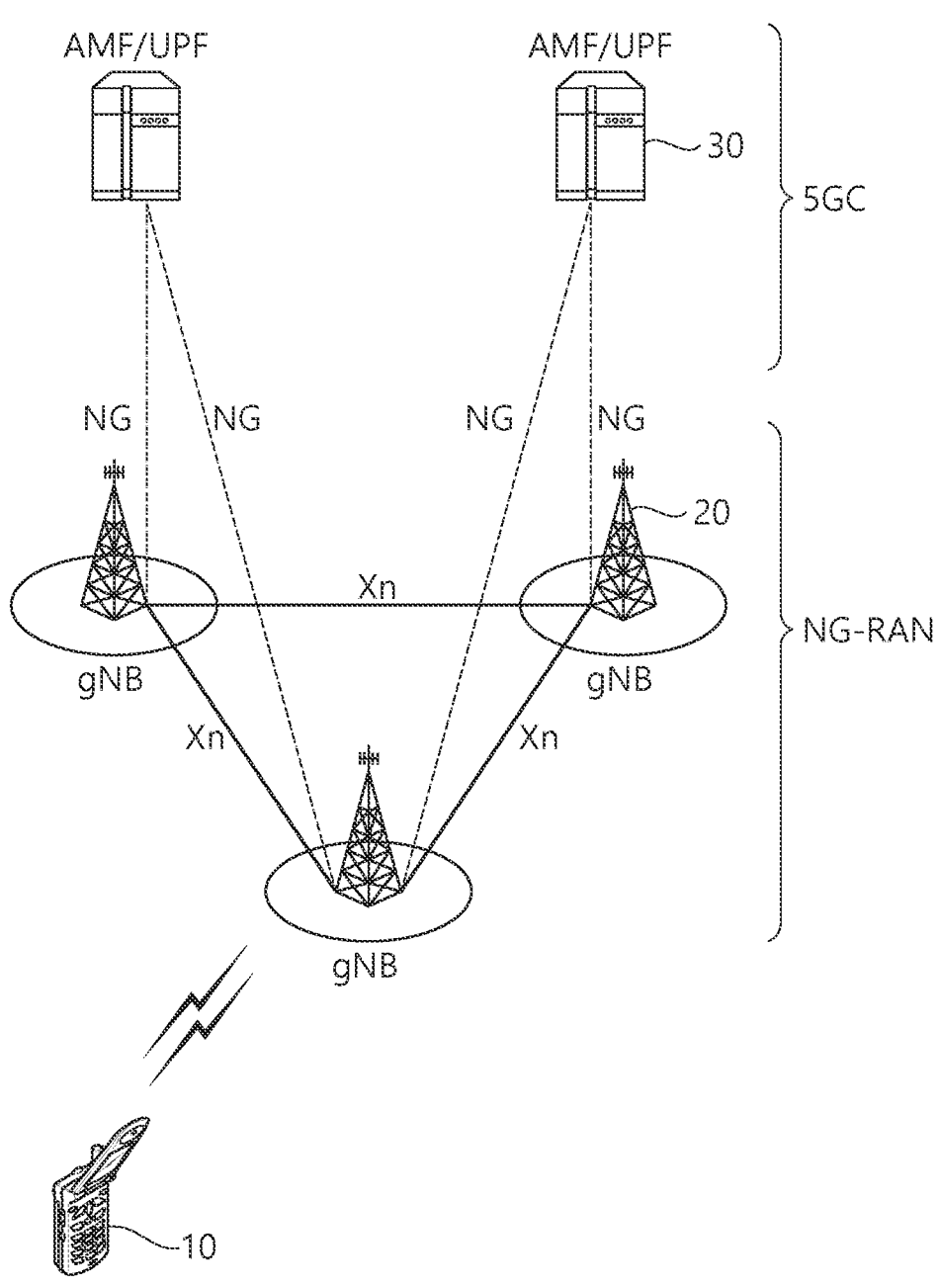
FIG. 2 shows a structure of an NR system, based on an embodiment of the present disclosure.

FIG. 2 shows a structure of an NR system, based on an embodiment of the present disclosure. The embodiment of FIG. 2 may be combined with various embodiments of the present disclosure.

Referring to FIG. 2, a next generation-radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 2 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Layers of a radio interface protocol between the UE and the network can be classified into a first layer (layer 1, L1), a second layer (layer 2, L2), and a third layer (layer 3, L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 3:
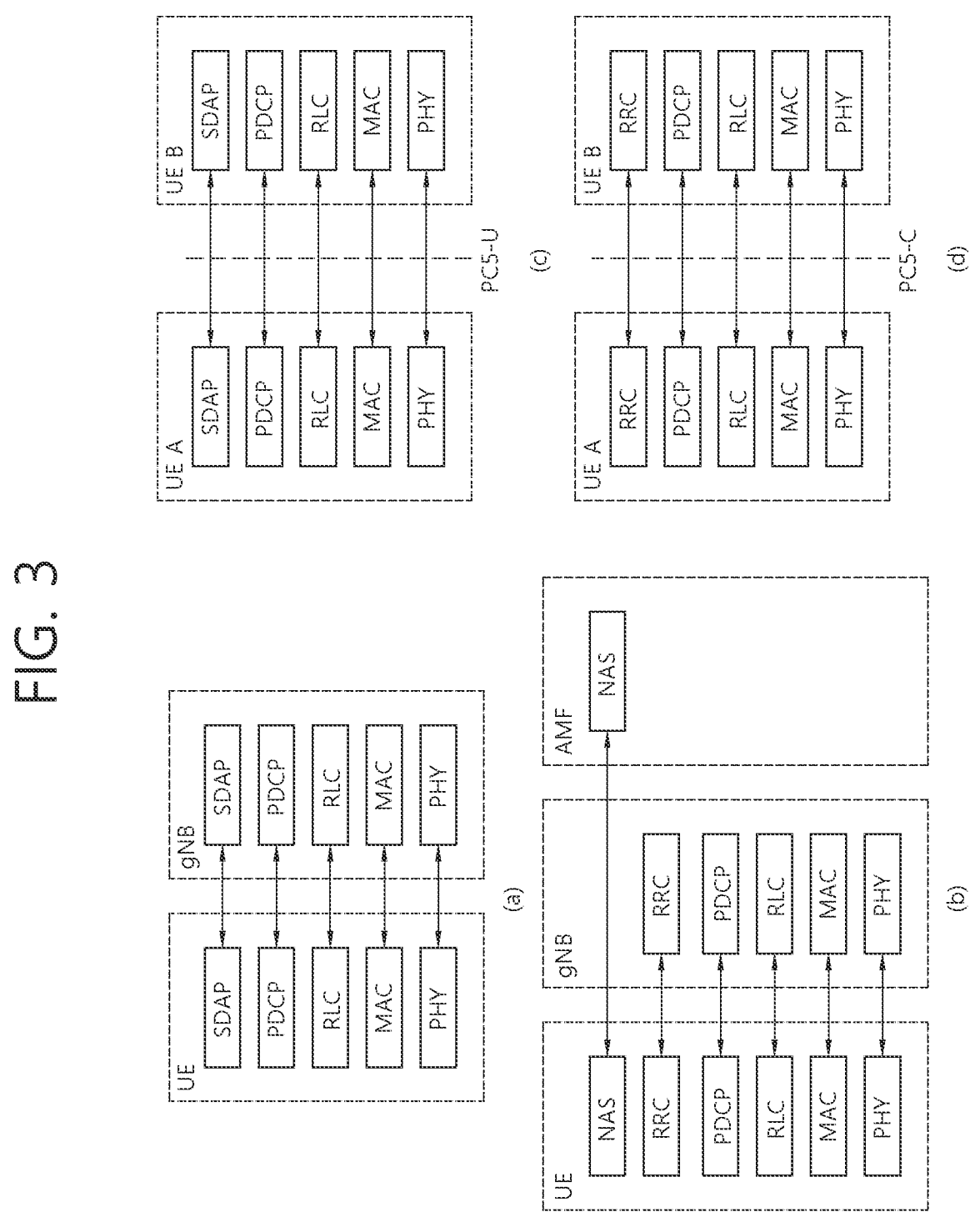

FIG. 3 shows a radio protocol architecture, based on an embodiment of the present disclosure. The embodiment of FIG. 3 may be combined with various embodiments of the present disclosure. Specifically, (a) of FIG. 3 shows a radio protocol stack of a user plane for Uu communication, and (b) of FIG. 3 shows a radio protocol stack of a control plane for Uu communication. (c) of FIG. 3 shows a radio protocol stack of a user plane for SL communication, and (d) of FIG. 3 shows a radio protocol stack of a control plane for SL communication.

Referring to FIG. 3, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., a MAC layer, an RLC layer, a packet data convergence protocol (PDCP) layer, and a service data adaptation protocol (SDAP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

Figure 4:
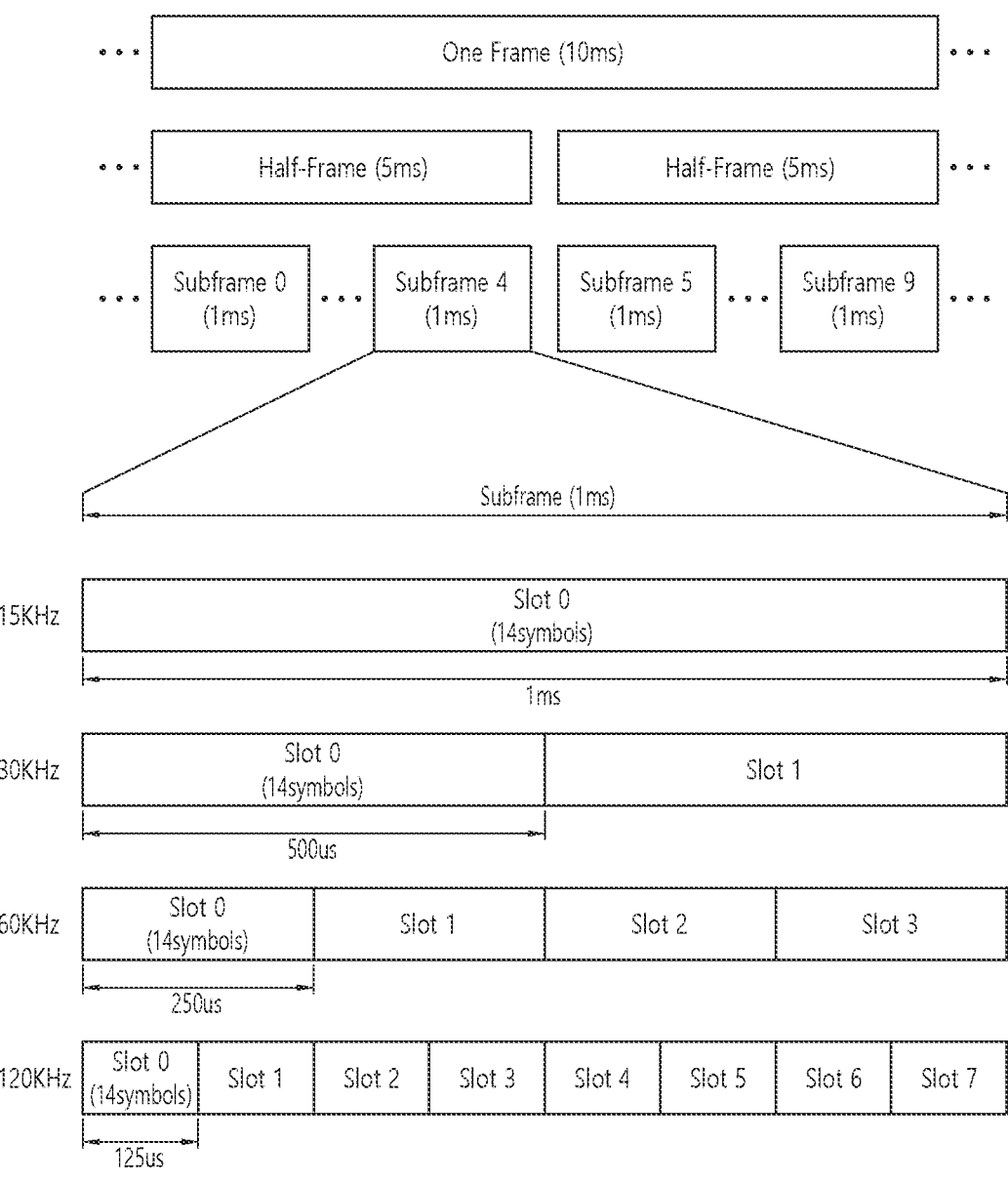
FIG. 4 shows a structure of a radio frame of an NR, based on an embodiment of the present disclosure.

FIG. 4 shows a structure of a radio frame of an NR, based on an embodiment of the present disclosure. The embodiment of FIG. 4 may be combined with various embodiments of the present disclosure.

Referring to FIG. 4, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined based on subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) based on an SCS configuration (u), in a case where a normal CP is used.

TABLE 1

| SCS ($15*2^u$) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe based on the SCS, in a case where an extended CP is used.

TABLE 2

| SCS ($15*2^u$) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 5:
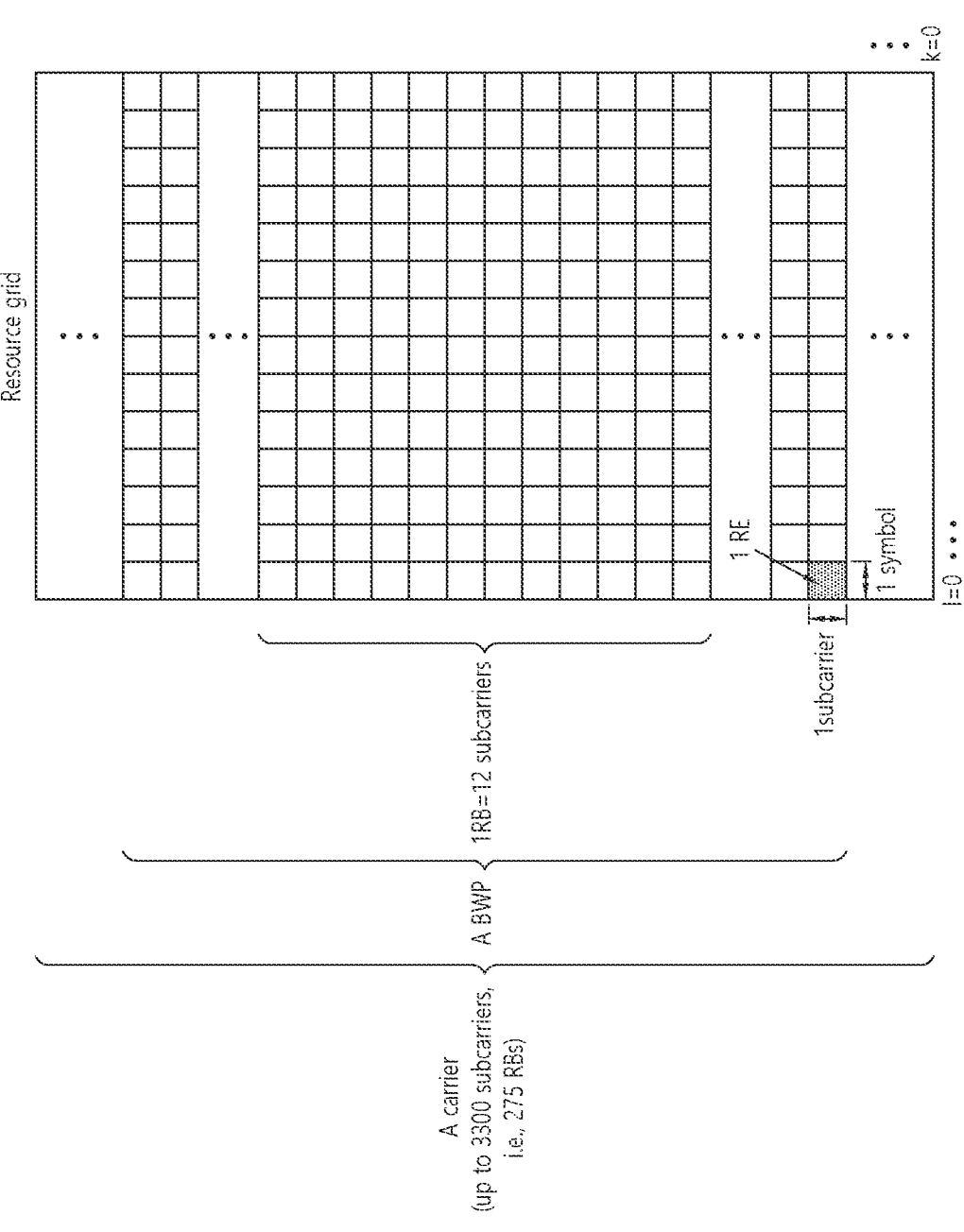
FIG. 5 shows a structure of a slot of an NR frame, based on an embodiment of the present disclosure.

FIG. 5 shows a structure of a slot of an NR frame, based on an embodiment of the present disclosure. The embodiment of FIG. 5 may be combined with various embodiments of the present disclosure.

Referring to FIG. 5, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, physical downlink shared channel (PDSCH), or channel state information-reference signal (CSI-RS) (excluding RRM) outside the active DL BWP. For example, the UE may not trigger a channel state information (CSI) report for the inactive DL BWP. For example, the UE may not transmit physical uplink control channel (PUCCH) or physical uplink shared channel (PUSCH) outside an active UL BWP. For example, in a downlink case, the initial BWP may be given as a consecutive RB set for a remaining minimum system information (RMSI) control resource set (CORE-SET) (configured by physical broadcast channel (PBCH)). For example, in an uplink case, the initial BWP may be given by system information block (SIB) for a random access procedure. For example, the default BWP may be configured by a higher layer. For example, an initial value of the default BWP may be an initial DL BWP. For energy saving, if the UE fails to detect downlink control information (DCI) during a specific period, the UE may switch the active BWP of the UE to the default BWP.

Meanwhile, the BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. For example, the UE may receive a configuration for the Uu BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 6:
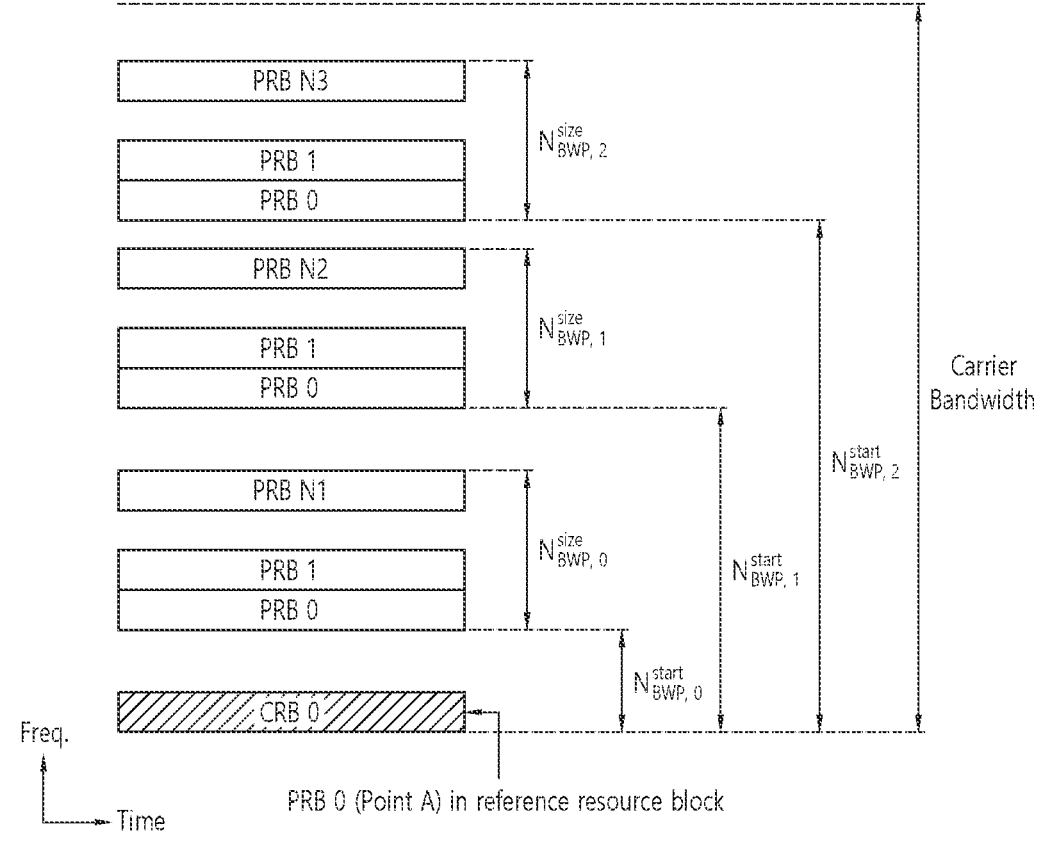
FIG. 6 shows an example of a BWP, based on an embodiment of the present disclosure.

FIG. 6 shows an example of a BWP, based on an embodiment of the present disclosure. The embodiment of FIG. 6 may be combined with various embodiments of the present disclosure. It is assumed in the embodiment of FIG. 6 that the number of BWPs is 3.

Referring to FIG. 6, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

A sidelink synchronization signal (SLSS) may include a primary sidelink synchronization signal (PSSS) and a secondary sidelink synchronization signal (SSSS), as an SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit cyclic redundancy check (CRC).

The S-PSS, the S-SSS, and the PSBCH may be included in a block format (e.g., SL synchronization signal (SS)/

PSBCH block, hereinafter, sidelink-synchronization signal block (S-SSB)) supporting periodical transmission. The S-SSB may have the same numerology (i.e., SCS and CP length) as a physical sidelink control channel (PSCCH)/ physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

FIG. 7 shows a UE performing V2X or SL communication, based on an embodiment of the present disclosure. The embodiment of FIG. 7 may be combined with various embodiments of the present disclosure.

Referring to FIG. 7, in V2X or SL communication, the term 'UE' may generally imply a UE of a user. However, if a network equipment such as a BS transmits/receives a signal according to a communication scheme between UEs, the BS may also be regarded as a sort of the UE. For example, a UE 1 may be a first apparatus 100, and a UE 2 may be a second apparatus 200.

For example, the UE 1 may select a resource unit corresponding to a specific resource in a resource pool which implies a set of series of resources. In addition, the UE 1 may transmit an SL signal by using the resource unit. For example, a resource pool in which the UE 1 is capable of transmitting a signal may be configured to the UE 2 which is a receiving UE, and the signal of the UE 1 may be detected in the resource pool.

Herein, if the UE 1 is within a connectivity range of the BS, the BS may inform the UE 1 of the resource pool. Otherwise, if the UE 1 is out of the connectivity range of the BS, another UE may inform the UE 1 of the resource pool, or the UE 1 may use a pre-configured resource pool.

In general, the resource pool may be configured in unit of a plurality of resources, and each UE may select a unit of one or a plurality of resources to use it in SL signal transmission thereof.

Hereinafter, resource allocation in SL will be described.

Figure 8:
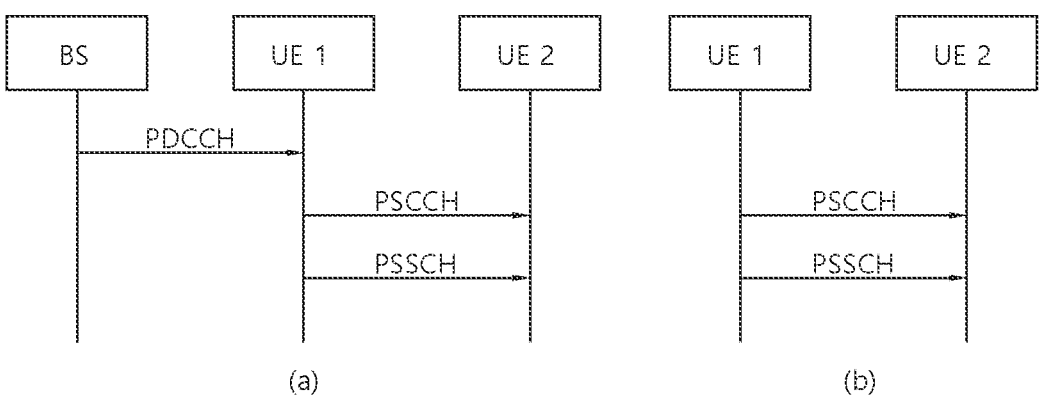
FIG. 8 shows a procedure of performing V2X or SL communication by a UE based on a transmission mode, based on an embodiment of the present disclosure.

FIG. 8 shows a procedure of performing V2X or SL communication by a UE based on a transmission mode, based on an embodiment of the present disclosure. The embodiment of FIG. 8 may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, (a) of FIG. 8 shows a UE operation related to an LTE transmission mode 1 or an LTE transmission mode 3. Alternatively, for example, (a) of FIG. 8 shows a UE operation related to an NR resource allocation mode 1. For example, the LTE transmission mode 1 may be applied to general SL communication, and the LTE transmission mode 3 may be applied to V2X communication.

For example, (b) of FIG. 8 shows a UE operation related to an LTE transmission mode 2 or an LTE transmission mode 4. Alternatively, for example, (b) of FIG. 8 shows a UE operation related to an NR resource allocation mode 2.

Referring to (a) of FIG. 8, in the LTE transmission mode 1, the LTE transmission mode 3, or the NR resource allocation mode 1, a BS may schedule an SL resource to be used by the UE for SL transmission. For example, the BS may perform resource scheduling to a UE 1 through a PDCCH (e.g., downlink control information (DCI)) or RRC signaling (e.g., Configured Grant Type 1 or Configured Grant Type 2), and the UE 1 may perform V2X or SL communication with respect to a UE 2 according to the resource scheduling. For example, the UE 1 may transmit a sidelink control information (SCI) to the UE 2 through a physical sidelink control channel (PSCCH), and thereafter transmit data based on the SCI to the UE 2 through a physical sidelink shared channel (PSSCH).

Referring to (b) of FIG. 8, in the LTE transmission mode 2, the LTE transmission mode 4, or the NR resource allocation mode 2, the UE may determine an SL transmission resource within an SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selective window by performing a sensing and resource (re)selection procedure. For example, the sensing may be performed in unit of subchannels. In addition, the UE 1 which has autonomously selected the resource within the resource pool may transmit the SCI to the UE 2 through a PSCCH, and thereafter may transmit data based on the SCI to the UE 2 through a PSSCH.

Figure 9:
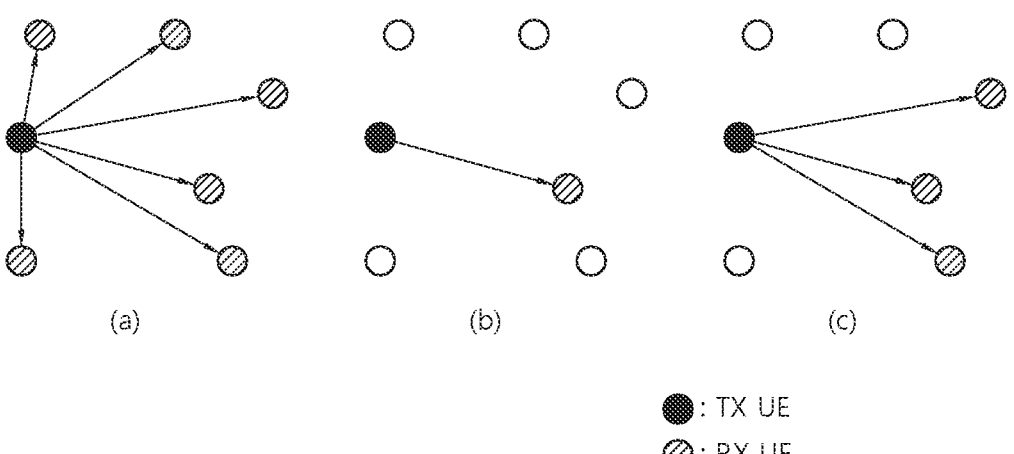
FIG. 9 shows three cast types, based on an embodiment of the present disclosure.

FIG. 9 shows three cast types, based on an embodiment of the present disclosure. The embodiment of FIG. 9 may be combined with various embodiments of the present disclosure. Specifically, (a) of FIG. 9 shows broadcast-type SL communication, (b) of FIG. 9 shows unicast type-SL communication, and (c) of FIG. 9 shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

Meanwhile, in NR V2X communication or NR sidelink communication, a transmitting UE may reserve/select one or more transmission resources for sidelink transmission (e.g., initial transmission and/or retransmission), and the transmitting UE may transmit information on the location of the one or more transmission resources to receiving UE(s).

Meanwhile, when performing sidelink communication, a method for a transmitting UE to reserve or pre-determine transmission resource(s) for receiving UE(s) may be representatively as follows.

For example, the transmitting UE may perform a reservation of transmission resource(s) based on a chain. Specifically, for example, if the transmitting UE reserves K transmission resources, the transmitting UE may transmit location information for less than K transmission resources to receiving UE(s) through a SCI transmitted to the receiving UE(s) at any (or specific) transmission time or a time resource. That is, for example, the SCI may include location information for less than the K transmission resources. Alternatively, for example, if the transmitting UE reserves K transmission resources related to a specific TB, the transmitting UE may transmit location information for less than K transmission resources to receiving UE(s) through a SCI transmitted to the receiving UE(s) at any (or specific)

transmission time or a time resource. That is, the SCI may include location information for less than the K transmission resources. In this case, for example, it is possible to prevent performance degradation due to an excessive increase in payloads of the SCI, by signaling only the location information for less than K transmission resources to the receiving UE(s) through one SCI transmitted at any (or specific) transmission time or the time resource by the transmitting UE.

Figure 10:
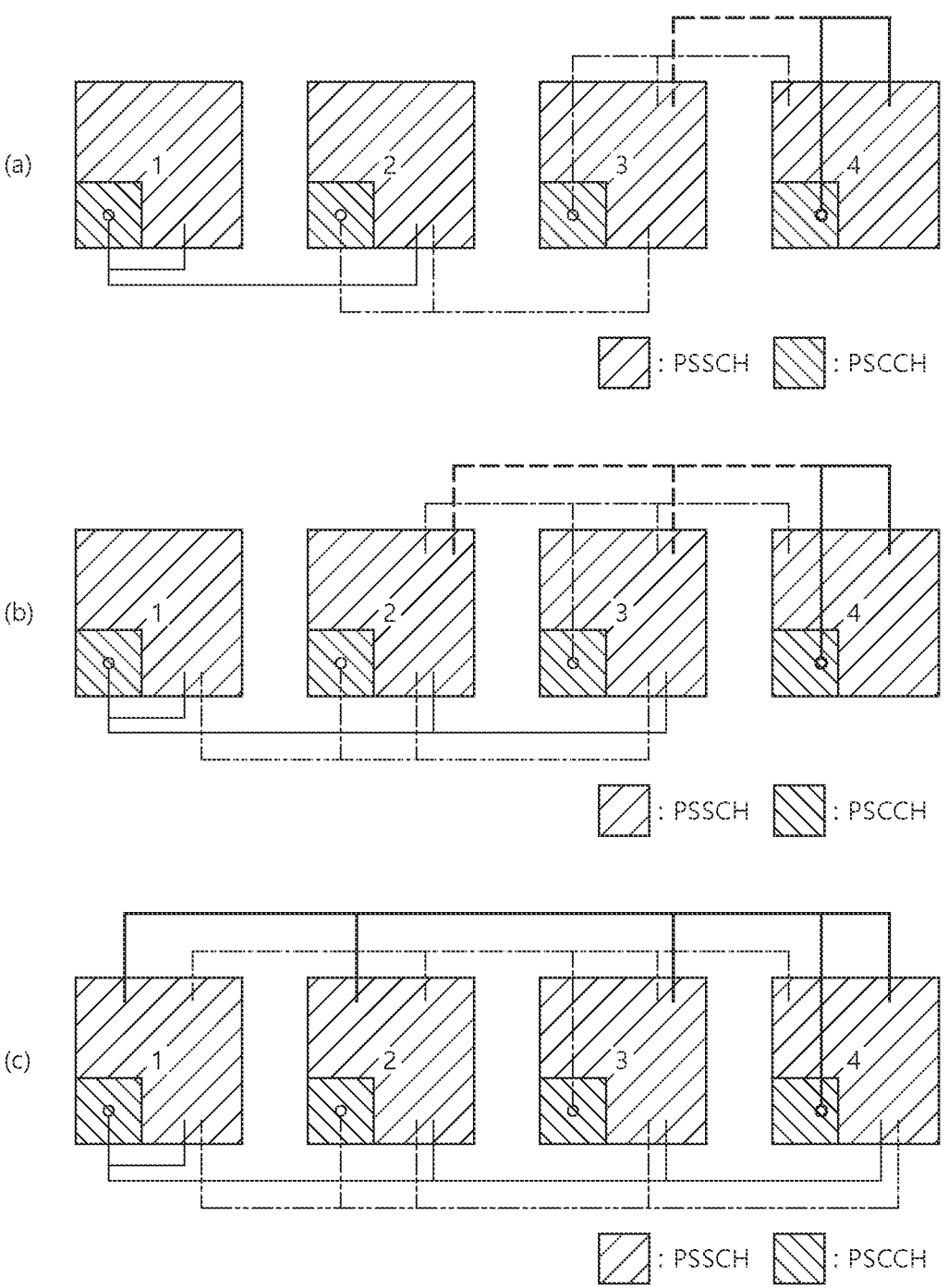
FIG. 10 shows a method in which a UE that has reserved transmission resource(s) informs another UE of the transmission resource(s), based on an embodiment of the present disclosure.

FIG. 10 shows a method in which a UE that has reserved transmission resource(s) informs another UE of the transmission resource(s), based on an embodiment of the present disclosure. The embodiment of FIG. 10 may be combined with various embodiments of the present disclosure.

Specifically, for example, (a) of FIG. 10 shows a method for performing by a transmitting UE chain-based resource reservation by transmitting/signaling location information of (maximum) 2 transmission resources to receiving UE(s) through one SCI, in the case of a value of K=4. For example, (b) of FIG. 10 shows a method for performing by a transmitting UE chain-based resource reservation by transmitting/signaling location information of (maximum) 3 transmission resources to receiving UE(s) through one SCI, in the case of a value of K=4. For example, referring to (a) and (b) of FIG. 10, the transmitting UE may transmit/signal only location information of the fourth transmission-related resource to the receiving UE(s) through the fourth (or last) transmission-related PSCCH. For example, referring to (a) of FIG. 10, the transmitting UE may transmit/signal to the receiving UE(s) not only location information of the fourth transmission-related resource but also location information of the third transmission-related resource additionally through the fourth (or last) transmission-related PSCCH. For example, referring to (b) of FIG. 10, the transmitting UE may transmit/signal to the receiving UE(s) not only location information of the fourth transmission-related resource but also location information of the second transmission-related resource and location information of the third transmission-related resource additionally through the fourth (or last) transmission-related PSCCH. In this case, for example, in (a) and (b) of FIG. 10, if the transmitting UE may transmit/signal to the receiving UE(s) only location information of the fourth transmission-related resource through the fourth (or last) transmission-related PSCCH, the transmitting UE may set or designate a field/bit of location information of unused or remaining transmission resource(s) to a pre-configured value (e.g., 0). For example, in (a) and (b) of FIG. 10, if the transmitting UE may transmit/signal to the receiving UE(s) only location information of the fourth transmission-related resource through the fourth (or last) transmission-related PSCCH, the transmitting UE may be set or designate a field/bit of location information of unused or remaining transmission resource(s) to a pre-configured status/bit value indicating/representing the last transmission (among 4 transmissions).

Meanwhile, for example, the transmitting UE may perform a reservation of transmission resource(s) based on a block. Specifically, for example, if the transmitting UE reserves K transmission resources, the transmitting UE may transmit location information for K transmission resources to receiving UE(s) through a SCI transmitted to the receiving UE(s) at any (or specific) transmission time or a time resource. That is, the SCI may include location information for K transmission resources. For example, if the transmitting UE reserves K transmission resources related to a specific TB, the transmitting UE may transmit location information for K transmission resources to receiving UE(s)

through a SCI transmitted to the receiving UE(s) at any (or specific) transmission time or a time resource. That is, the SCI may include location information for K transmission resources. For example, (c) of FIG. 10 shows a method for performing by the transmitting UE block-based resource reservation, by signaling location information of 4 transmission resources to receiving UE(s) through one SCI, in the case of a value of K=4.

Figure 11:
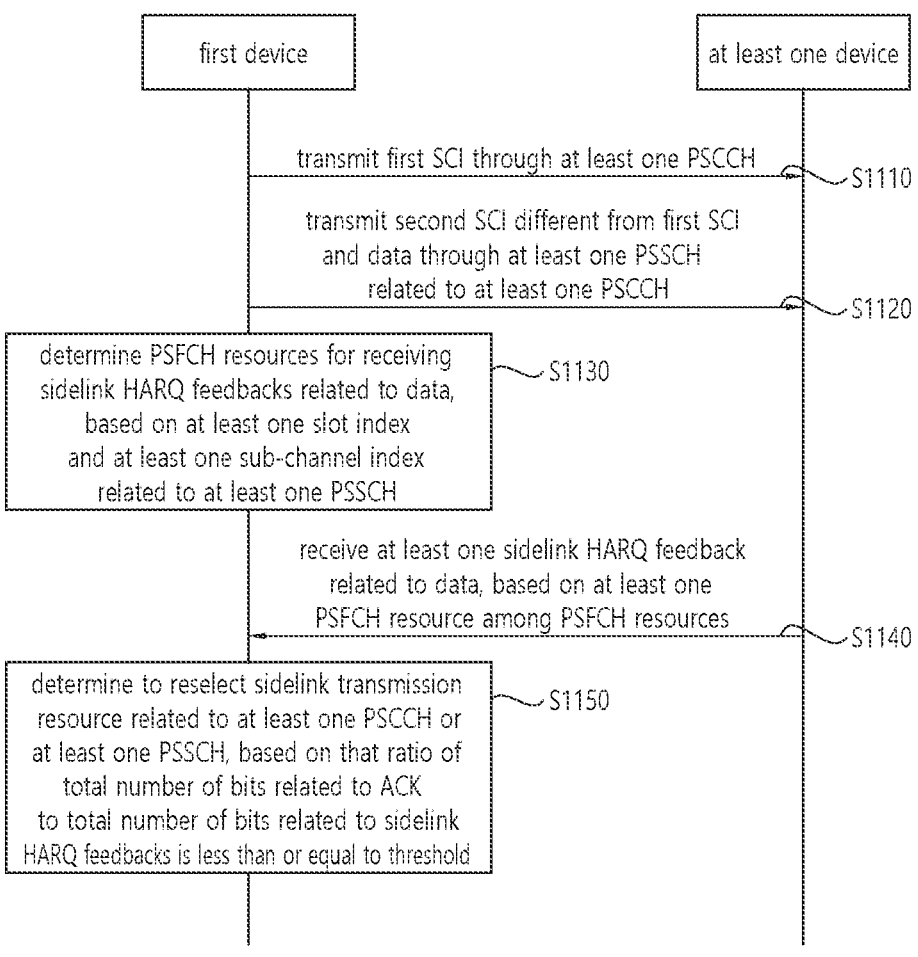
FIG. 11 shows a method for a first device and a second device to perform sidelink communication, based on an embodiment of the present disclosure.

FIG. 11 shows a method for a first device and a second device to perform sidelink communication, based on an embodiment of the present disclosure.

In step S1110, the first device according to an embodiment may transmit, to at least one device, first sidelink control information (SCI) through at least one PSCCH. In step S1120, the first device according to an embodiment may transmit, to the at least one device, second SCI different from the first SCI and data through at least one PSSCH related to the at least one PSCCH. In step S1130, the first device according to an embodiment may determine a plurality of PSFCH resources for receiving a plurality of sidelink HARQ feedbacks related to the data, based on at least one slot index and at least one sub-channel index related to the at least one PSSCH. In step S1140, the first device according to an embodiment may receive, from the at least one device, at least one sidelink HARQ feedback related to the data, based on at least one PSFCH resource among the plurality of PSFCH resources. In step S1150, the first device according to an embodiment may determine to reselect a sidelink transmission resource related to the at least one PSCCH or the at least one PSSCH, based on that a ratio of a total number of bits related to acknowledgement (ACK) to a total number of bits related to the plurality of sidelink HARQ feedbacks is less than or equal to a threshold.

Hereinafter, embodiments and/or examples that can be directly or indirectly related to at least one of steps S1110 to S1150 will be described. Meanwhile, the following embodiments and/or examples only relate to at least one of steps S1110 to S1150, and therefore, even if at least one of the following embodiments and/or examples and steps S1110 to S1150 contradict each other in content, contradicted contents should not be construed outside the scope of the present disclosure.

Meanwhile, in the present disclosure, for example, a transmitting UE (TX UE) may be a UE which transmits data to a (target) receiving UE (RX UE). For example, the TX UE may be a UE which performs PSCCH transmission and/or PSSCH transmission. Additionally/alternatively, the TX UE may be a UE which transmits SL CSI-RS(s) and/or a SL CSI report request indicator to the (target) RX UE. Additionally/alternatively, the TX UE may be a UE which transmits a (control) channel (e.g., PSCCH, PSSCH, etc.) and/or reference signal(s) on the (control) channel (e.g., DM-RS, CSI-RS, etc.), to be used for a SL RLM operation and/or a SL RLF operation of the (target) RX UE.

Meanwhile, in the present disclosure, for example, a receiving UE (RX UE) may be a UE which transmits SL HARQ feedback to a transmitting UE (TX UE) based on whether decoding of data received from the TX UE is successful and/or whether detection/decoding of a PSCCH (related to PSSCH scheduling) transmitted by the TX UE is successful. Additionally/alternatively, the RX UE may be a UE which performs SL CSI transmission to the TX UE based on SL CSI-RS(s) and/or a SL CSI report request indicator received from the TX UE. Additionally/alternatively, the RX UE is a UE which transmits a SL (L1) RSRP measurement value, to the TX UE, measured based on (pre-defined) reference signal(s) and/or a SL (L1) RSRP report request indicator received from the TX UE. Additionally/alternatively, the RX UE may be a UE which transmits data of the RX UE to the TX UE. Additionally/alternatively, the RX UE may be a UE which performs a SL RLM operation and/or a SL RLF operation based on a (pre-configured) (control) channel and/or reference signal(s) on the (control) channel received from the TX UE.

Meanwhile, in the present disclosure, for example, in case the RX UE transmits SL HARQ feedback information for a PSSCH and/or a PSCCH received from the TX UE, the following options or some of the following options may be considered. Herein, for example, the following options or some of the following options may be limitedly applied only if the RX UE successfully decodes/detects a PSCCH scheduling a PSSCH.

Option 1) NACK information may be transmitted to the TX UE only if the RX UE fails to decode/receive the PSSCH received from the TX UE.

Option 2) If the RX UE succeeds in decoding/receiving the PSSCH received from the TX UE, ACK information may be transmitted to the TX UE, and if the RX UE fails to decode/receive the PSSCH, NACK information may be transmitted to the TX UE.

Meanwhile, in the present disclosure, for example, the TX UE may transmit the following information or some of the following information to the RX UE through SCI(s). Herein, for example, the TX UE may transmit some or all of the following information to the RX UE through a first SCI and/or a second SCI PSSCH (and/or PSCCH) related resource allocation information (e.g., the location/number of time/frequency resources, resource reservation information (e.g., period))

SL CSI report request indicator or SL (L1) RSRP (and/or SL (L1) RSRQ and/or SL (L1) RSSI) report request indicator SL CSI transmission indicator (or SL (L1) RSRP (and/or SL (L1) RSRQ and/or SL (L1) RSSI) information transmission indicator) (on a PSSCH)

Modulation and Coding Scheme (MCS) information

TX power information

L1 destination ID information and/or L1 source ID information

SL HARQ process ID information

NDI information

RV information (Transmission traffic/packet related) QoS information (e.g., priority information)

SL CSI-RS transmission indicator or information on the number of antenna ports for (transmitting) SL CSI-RS TX UE location information or location (or distance range) information of the target RX UE (for which SL HARQ feedback is requested)

Reference signal (e.g., DM-RS, etc.) information related to decoding (and/or channel estimation) of data transmitted through a PSSCH. For example, information related to a pattern of (time-frequency) mapping resources of DM-RS(s), RANK information, antenna port index information, etc.

Meanwhile, in the present disclosure, for example, since the TX UE may transmit a SCI, a first SCI and/or a second SCI to the RX UE through a PSCCH, the PSCCH may be replaced/substituted with the SCI and/or the first SCI and/or the second SCI. Additionally/alternatively, the SCI may be replaced/substituted with the PSCCH and/or the first SCI and/or the second SCI. Additionally/alternatively, for example, since the TX UE may transmit a second SCI to the RX UE through a PSSCH, the PSSCH may be replaced/substituted with the second SCI.

Meanwhile, in the present disclosure, for example, if SCI configuration fields are divided into two groups in consideration of a (relatively) high SCI payload size, the first SCI including a first SCI configuration field group may be referred to as a first SCI, and the second SCI including a second SCI configuration field group may be referred to as a second SCI. Also, for example, the first SCI may be transmitted to the receiving UE through a PSCCH. Also, for example, the second SCI may be transmitted to the receiving UE through a (independent) PSCCH or may be piggybacked and transmitted together with data through a PSSCH.

Meanwhile, in the present disclosure, for example, "configuration" or "definition" may mean a (pre)configuration from a base station or a network (through predefined signaling (e.g., SIB, MAC, RRC, etc.)) (for each resource pool).

Meanwhile, in the present disclosure, for example, since an RLF may be determined based on out-of-synch (OOS) indicator(s) or in-synch (IS) indicator(s), the RLF may be replaced/substituted with out-of-synch (OOS) indicator(s) or in-synch (IS) indicator(s).

Meanwhile, in the present disclosure, for example, an RB may be replaced/substituted with a subcarrier. Also, in the present disclosure, for example, a packet or a traffic may be replaced/substituted with a TB or a MAC PDU based on a transmission layer.

Meanwhile, in the present disclosure, a CBG or a CG may be replaced/substituted with a TB.

Meanwhile, in the present disclosure, for example, a source ID may be replaced/substituted with a destination ID.

Meanwhile, in the present disclosure, for example, an L1 ID may be replaced/substituted with an L2 ID. For example, the L1 ID may be an L1 source ID or an L1 destination ID. For example, the L2 ID may be an L2 source ID or an L2 destination ID.

Meanwhile, in the present disclosure, for example, an operation of the transmitting UE to reserve/select/determine retransmission resource(s) may include: an operation of the transmitting UE to reserve/select/determine potential retransmission resource(s) for which actual use will be determined based on SL HARQ feedback information received from the receiving UE.

Meanwhile, in the present disclosure, SL mode 1 may refer to a resource allocation method or a communication method in which a base station directly schedules sidelink transmission (SL TX) resource(s) of a UE through predefined signaling (e.g., DC). Also, for example, SL mode 2 may refer to a resource allocation method or a communication method in which a UE independently selects SL TX resource(s) within a resource pool configured or pre-configured from a base station or a network.

Meanwhile, in the present disclosure, for example, for convenience of description, a (physical) channel used when the RX UE transmits at least one of the following information to the TX UE may be referred to as a PSFCH.

SL HARQ feedback, SL CSI, SL (L1) RSRP

Meanwhile, in the next-generation system, the transmitting UE may reserve resource(s) for future transmission. Meanwhile, the transmitting UE may reserve resource(s) through a PSCCH and/or a PSSCH. Specifically, for example, the transmitting UE may indicate the time location of resource(s) reserved for future transmission from a resource for transmission of an initial PSCCH and/or PSSCH related to resource reservation through SCI. For example, the transmitting UE may transmit information related to a time interval (e.g., slot interval) between a resource for transmission of an initial PSCCH and/or PSSCH related to resource reservation and resource(s) reserved for future transmission through SCI. For example, a resource reservation period may be given in units of msec, and the UE may determine the location of actually reserved resource(s) by converting the resource reservation period into the number of logical slots (e.g., (TX) resources in a resource pool).

Meanwhile, referring to LTE V2X, the resource reservation period may be converted into the number of logical subframes, and a scaling value may be additionally multiplied by the number of logical subframes according to a TDD UL-DL configuration value. Specifically, for example, in order to minimize the difference between a resource reservation period in units of an absolute time and a period converted into the number of logical resources, the number of logical resources may be reduced in proportion to the number of UL subframes within a specific period in a TDD UL-DL configuration. For example, if a TDD-UL-DL configuration value is 5, the number of UL subframes within a 100 msec period may be 10. Thus, the UE may extract/obtain a logical subframe offset value by multiplying a resource reservation period value by $\frac{1}{10}$. For example, if a resource reservation period value is 100 msec, the UE may convert the resource reservation period value into 10 logical subframes, and the time difference between the initial transmission and the reserved resource may be 10 subframes in terms of logical subframes. If all UL subframes are included in a resource pool, a difference of 10 logical subframes may be equal to 100 msec as an absolute time difference.

Meanwhile, in the next-generation system, slot formats according to a TDD-UL-DL configuration may vary, and there is no guarantee that all slots configured as UL are configured to be included in an SL resource pool. That is, depending on the configuration, the absolute time difference value between the resource reservation period and the actual resource may be significantly different.

Based on an embodiment of the present disclosure, a slot to be included in an SL resource pool may be a slot as UL indicated by a TDD configuration indicated in a PSBCH and/or an RRC configuration and/or a TDD-UL-DL configuration, and/or a slot in which symbols from the start symbol index to the end symbol index for SL within the slot are indicated as UL. In addition, the above process may be performed in units of slot groups of TDD configuration units that can be indicated by a PSBCH. The UE may repeatedly apply a bitmap with a specific size to slots that satisfy the above condition within a first period (e.g., a time interval with 10240 msec), and slots corresponding to bitmap information 1 may belong to the resource pool. Reserved slot(s) may exist between slot groups to which the bitmap is applied. For example, the size of the bitmap may be configured to the number of slots that can be used as SL among slots within a 20 msec period (by assuming that S-SSB does not exist).

In the present disclosure, a slot that can be used as SL may be a slot configured as UL from a start symbol to an end symbol in the slot. For example, a slot that can be used as SL may be a slot including at least one UL symbol. In the present disclosure, a specific period may be 20 msec, a multiple of 20 msec, or a total period according to a TDD configuration.

Based on an embodiment of the present disclosure, the UE may convert a resource reservation period in units of msec into the number of slots based on SCS of an SL BWP, and the UE may determine/obtain the number of logical slots by multiplying the converted number of slots by a scaling value. Herein, the scaling value may be a ratio between the size of the bitmap and/or the number of slots that can be used as SL within the specific period and the total number of slots within the specific period. For example, the scaling value may be defined as in Equation 1 or Equation 2.

$$\text{Scaling value} = \frac{\text{(the size of the bitmap)}}{\text{(the total number of slots within the specific period)}} \quad \text{[Equation 1]}$$

$$\text{Scaling value} = \frac{\text{(the number of slots that can be used as SL within the specific period)}}{\text{(the total number of slots within the specific period)}} \quad \text{[Equation 2]}$$

For example, if the size of the bitmap or the number of slots that can be used as SL within the specific period is N and the total number of slots within the specific period is M, the UE may obtain/determine a first value by multiplying N/M by a resource reservation period or a value obtained by converting the resource reservation period value into the number of slots based on the SCS of the SL BWP. Herein, for example, the UE may obtain/determine the number of logical slots through a round-up operation for the first value. For example, the UE may obtain/determine the number of logical slots through a round-off operation for the first value. For example, the UE may obtain/determine the number of logical slots through a round-down operation for the first value. In the above, for example, the UE may count the number of slots based on the SCS of the SL BWP. For example, the UE may count the number of slots based on reference SCS for an SL resource pool configuration.

Based on an embodiment of the present disclosure, the UE may convert a resource reservation period in units of msec into the number of slots based on SCS of an SL BWP, and the UE may determine/obtain the number of logical slots by multiplying the converted number of slots by a scaling value. Herein, the scaling value may be a ratio between the number of slots corresponding to bitmap information 1 within the specific period and the total number of slots within the specific period. For example, the scaling value may be defined as in Equation 3.

$$\text{Scaling value} = \frac{\text{(the number of slots corresponding to bitmap information 1 within the specific period)}}{\text{(the total number of slots within the specific period)}} \quad \text{[Equation 3]}$$

For example, if the number of slots corresponding to bitmap information 1 within the specific period is N and the total number of slots within the specific period is M, the UE may obtain/determine a second value by multiplying N/M by a resource reservation period or a value obtained by converting the resource reservation period into the number of slots based on the SCS of the SL BWP. Herein, for example, the UE may obtain/determine the number of logical slots through a round-up operation for the second value. For example, the UE may obtain/determine the number of logical slots through round-off operation for the second value. For example, the UE may obtain/determine the number of logical slots through a round-down operation for the second value. In the above, for example, the UE may count the number of slots based on the SCS of the SL BWP. For example, the UE may count the number of slots based on reference SCS for an SL resource pool configuration.

Based on an embodiment of the present disclosure, the scaling value may be configured or pre-configured for the UE for each resource pool. For example, the scaling value may be configured or pre-configured for the UE for each SL BWP. For example, the scaling value may be configured or pre-configured for the UE for each serving cell. Herein, for example, assuming that the scaling value is "A", the UE may obtain/determine a third value by multiplying "A" by a resource reservation period. Herein, for example, the UE may obtain/determine the number of logical slots based on the SCS of the SL BWP through a round-up operation for the third value. For example, the UE may obtain/determine the number of logical slots based on the SCS of the SL BWP through a round-off operation for the third value. For example, the UE may obtain/determine the number of logical slots based on the SCS of the SL BWP through a round-down operation for the third value. In the above, for example, the UE may count the number of slots based on the SCS of the SL BWP. For example, the UE may count the number of slots based on reference SCS for an SL resource pool configuration.

Meanwhile, a method of interpreting a value indicated by a resource reservation period and/or a slot offset indicated by a time domain resource assignment field indicated by SCI or a converted slot offset value thereof may be different. More specifically, when interpreting the slot offset, (in the case of the first method) a slot offset may be applied to slots belonging to a resource pool, or (in the case of the second method) a slot offset may be applied to slots to which the bitmap is applied when configuring the resource pool. The second method may be applied to a set of slots in which a symbol period including the number of sidelink symbols from the sidelink start symbol (pre-)configured in a slot is cell-specific UL. Or, the second method may be applied to a set of slots excluding S-SSB slots and/or reserved slots from a set of slots in which a symbol period including the number of sidelink symbols from the sidelink start symbol (pre-)configured in a slot is cell-specific UL.

For example, the slot offset indicated by the time domain resource assignment field may be applied based the first method, and the value indicated by the resource reservation period or the converted slot offset value thereof may be applied based on the second method. In this case, reserved resources within a period may be repeated based on the resource reservation period, and in this case, it is necessary to determine a method of configuring the reserved resources within the next period according to the time domain resource assignment field value.

For example, the UE determines the location of a plurality of reserved resource slots by using the time domain resource assignment field value (from a slot in which SCI is transmitted and received), and the UE may apply the resource reservation period value or the corresponding value converted to units of logical slots from each reserved resource slot location. More specifically, if the time domain resource assignment field value in SCI indicates t1 and t2, and the UE transmits and/or receives the SCI in the slot n, the UE may firstly determine slots n1 and n2 after logical slots t1 and t2 from the slot n based on the first method. Next, for reserved resources within the next period, the UE may determine n'+P', n1'+P', and n2'+P' as the location of reserved resources in the logical slot domain of the second method by applying the resource reservation period value based on the second method. The above n', n1', and n2' may be values obtained by converting slots n, n1, and n2 into logical slot indexes of the logical slot domain of the second method, respectively. Herein, P may be a value obtained by converting the resource reservation period P into units of logical slots. The advantage of the above method is that it is possible to maintain the interval (in the logical slot domain of the second method) between the reserved resources in the next period from each reserved resource in the period. On the other hand, it may be necessary to ensure that each slot is included in a resource pool in the resource pool configuration for each.

For example, for the next period, the UE may apply the resource reservation period value or the corresponding value converted to units of logical slots (from a slot in which SCI is transmitted and received), and the UE may determine the location of a plurality of reserved resource slots by using the time domain resource assignment field value based on the corresponding slot. More specifically, if the time domain resource assignment field value in SCI indicates t1 and t2, and the UE transmits and/or receives the SCI in the slot n, the UE may firstly determine slots n1 and n2 after logical slots t1 and t2 from the slot n based on the first method. Next, for reserved resources within the next period, the UE may determine n'+P' as the location of reserved resources in the logical slot domain of the second method by applying the resource reservation period value based on the second method. The above n' may be a value obtained by converting the slot n into a logical slot index of the logical slot domain of the second method. Herein, P' may be a value obtained by converting the resource reservation period P into units of logical slots. Next, the UE may convert the slot n'+P' in the logical slot domain of the second method into the logical slot domain n" of the first method, and the UE may determine n"+t1 and n"+t2 from the corresponding slot as the location of reserved resource slots in the corresponding period in the logical slot domain of the first method.

Meanwhile, in order to prevent deviation of a resource reservation period for each first period (e.g., 10240 msec) for a resource pool, a value of the resource reservation period converted into the number of logical slots may be quantized instead of one slot unit. For example, the value of the resource reservation period may be limited to a divisor of the total number of slots corresponding to bitmap information 1 within the first period (e.g., 10240 msec). Based on the quantization method, the resource reservation period value may be changed to the nearest conversion value, or it may be changed to the earliest time point among time points that are not earlier in time than the resource reservation period value.

Meanwhile, all or part of resources periodically reserved by the UE may be overlapped with resources periodically reserved by other UEs. Since the UE cannot receive SCI from other UEs in its own transmission slot in a resource (re)selection procedure of the UE, resource collision may also occur continuously if the periodic resources collide with each other as described above. In the above situation, the detection performance for a PSCCH/PSSCH transmitted in the periodic reserved resources may be greatly deteriorated, and at least, a method to avoid continuous resource collision may be desired.

For example, the UE may skip transmission in a part of reserved resources or reserved candidate resources for PSCCH/PSSCH transmission and perform a reception operation. For example, a time when the reception operation is performed instead of the transmission operation may be determined by UE implementation. For example, the UE may randomly select the time when the reception operation is performed instead of the transmission operation In the above, the UE may perform the reception operation instead of N transmissions within M periods. For example, the M value may be pre-configured for each resource pool and/or for each priority of a transmission packet and/or for each service type and/or for each congestion level and/or for each QoS parameter. For example, the N value may be pre-configured for each resource pool and/or for each priority of a transmission packet and/or for each service type and/or for each congestion level and/or for each QoS parameter. For example, the time when the reception operation is performed instead of the transmission operation may be applied if a ratio of ACK to the total number of SL HARQ-ACK bits that the UE expects to receive is less than (or equal to) a specific threshold. For example, the threshold may be pre-configured for each resource pool and/or for each priority of a transmission packet and/or for each service type and/or for each congestion level and/or for each QoS parameter.

For example, the UE may inform other UEs of reservation resources by using a resource other than the reservation resources, instead of informing other UEs of information on periodic reservation resources through on a part of the reservation resources. For example, when the UE indicates the information on reservation resources, information indicating the start time of the first reservation resource (e.g., slot offset) may be included. For example, the slot offset value may indicate the location of a slot in which the first reservation resource is located in a period from a time when the reservation resources are indicated. The information indicating the start time of the reservation resource may be transmitted through the first SCI (e.g., using a reserved field) and/or the second SCI and/or the PSSCH.

For example, the UE may trigger a resource reselection procedure if a ratio of (the total number of bits related to) ACK to the total number of SL HARQ-ACK bits that the UE expects to receive is less than (or equal to) a specific threshold. For example, the UE may trigger a resource reselection procedure if a CQI index value of a CSI report received by the UE is less than (or equal to) a specific threshold. For example, the threshold may be pre-configured for each resource pool and/or for each priority of a transmission packet and/or for each service type and/or for each congestion level and/or for each QoS parameter.

For example, when periodically transmitting a PSCCH/PSSCH, the UE may change or hop a time and/or frequency resource of the PSCCH/PSSCH for each period. For example, the location of slots for the periodic PSCCH/PSSCH may be different for each period. For example, the location of start subchannels for the periodic PSCCH/PSSCH may be different for each period. For example, the hopping pattern may be periodically and randomly changed by the UE. For example, the hopping pattern may be determined based on a parameter (pre-)configured for each PSCCH CRC and/or for each L1 destination ID and/or for each L1 source ID and/or for each resource pool. For example, the location of resources that can be hopped may be derived from periodic reservation resources of the UE. For example, the resources that can be hopped may include the next slot of periodic reservation resources. For example, the resources that can be hopped may include slots after P slots from periodic reservation resources. The P value may be a value (pre-)configured for each resource pool. For example, the resources that can be hopped may be a set of a plurality of sub-channels after or before a set of sub-channels allocated for periodic reservation resources. The number of sub-channels (in a slot) constituting the set of additional sub-channels may be the same as the number of sub-channels in a slot for periodic reservation resources. For example, the location of resources that can be hopped may be indicated by being included in periodic reservation resources of the UE. For example, the UE may reserve resources more than an actual required amount when reserving the resources. For example, the UE may use a part of the reserved resource for actual transmission. For example, the UE may indicate whether to transmit a TB by using all of resources indicated by the first SCI or to transmit a TB by using a part of resources indicated by the first SCI, through the first SCI and/or the second SCI and/or the PSSCH. The above process may include determining whether to calculate based on resources indicated by the first SCI or a part of resources indicated by the first SCI when calculating the TB.

Figure 12:
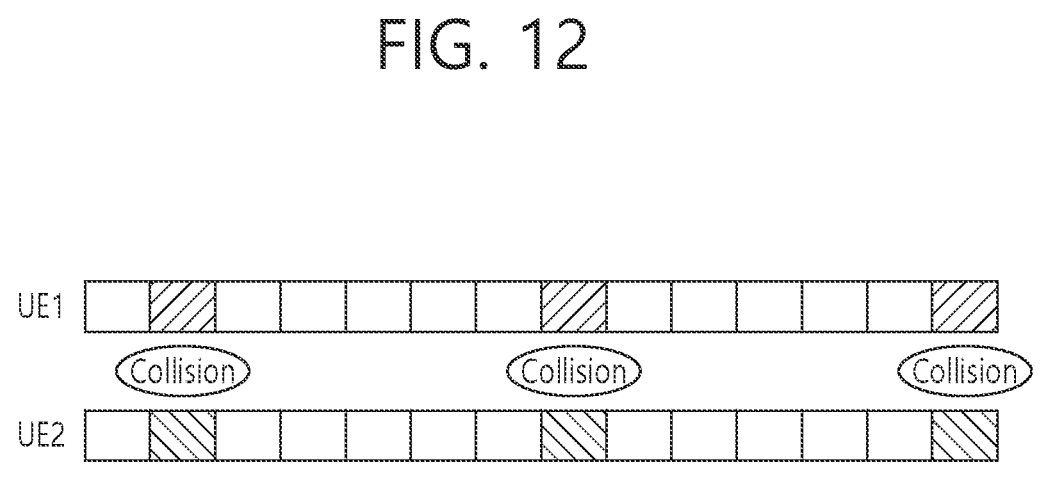

FIG. 12 shows an example of continuous collision between periodic traffic of different UEs.

Table 5 below corresponds to an example of continuous collision between periodic traffic of different UEs.

TABLE 5

Lastly, it needs to consider whether or how to handle the consecutive collisions between different periodic traffics as shown in FIG. 2. In Rel-16 NR sidelink, a UE cannot monitor SCI in a slot where the UE's own transmissions occur. In addition, it is possible that a UE misses detection of a SCI which indicates reserved resources of another UE. In this case, the reserved resources of another UE would not be excluded from the candidate resources of the UE, and there is a case where the UE uses these resources for its own transmission. In those cases, once the different periodic traffics of different UEs are fully or partially overlapping each other, these collisions would occur periodically, and these UEs may not know this situation for a long time. To avoid this consecutive collisions among these UEs, it would be necessary to investigate how the UE triggers resource (re)evaluation.

Table 6 below corresponds to another example of continuous collision between periodic traffic of different UEs.

TABLE 6

For instance, when the SL HARQ-ACK feedback is enabled, the UE may decide whether or not to trigger resource re-evaluation based on the statistics of the SL HARQ-ACK states. Alternatively, the indication of these reserved resources could be transmitted in a slot other than the UE performs its own transmission. Another approach is to allow a UE halts its own
transmission and the UE tries to monitor SCI from other UEs in a slot where the UE is assumed to perform its own transmission. Another approach is that the UE transmit periodic PSCCH/PSSCH with hopping operation. To be specific, the periodic PSCCH/PSSCH resources could be hopped across different slots or across different sub-channels. To do this, the UE can reserve more SL resources compared to the actually required amount of the SL resources for the periodic traffic. For instance, for a given periodic traffic, a single sub-channel in a single-slot would be needed within a period. In this case, for time-and/or-frequency hopping to avoid consecutive collisions, the UE can reserve two sub-channels in two slots within a period, and the UE can randomly select a single sub-channel and a single slot for each period to transmit PSCCH/PSSCH.

Table 7 below corresponds to another example of continuous collision between periodic traffic of different UEs.

TABLE 7

Observation 3: Once consecutive collisions occur among different periodic traffics of different UEs, these UEs may not know this situation, and it will cause PSCCH/PSSCH detection performance degradation in a number of slots.
Proposal 3: RAN1 discusses whether or how to handle the consecutive collisions of periodic
traffics among following candidate:
Temporary muting for a slot of PSCCH/PSSCH transmission to monitor other SCI.
Time-and-frequency hopping across different periods of periodic PSCCH/PSSCH transmission.
Pre-reservation signaling.
Resource re-evaluation triggered based on SL HARQ-ACK feedback.

FIG. 13 shows a method for a first device to perform sidelink communication based on an embodiment of the present disclosure.

The operations disclosed in the flowchart of FIG. 13 may be performed in combination with various embodiments of the present disclosure. In an embodiment, the operations disclosed in the flowchart of FIG. 13 may be performed based on at least one of the devices illustrated in FIGS. 15 to 20. In an embodiment, the first device of FIG. 13 may correspond to the first wireless device 100 of FIG. 16 to be described later, and the second device of FIG. 13 may correspond to the second wireless device 200 of FIG. 16 to be described later. In another embodiment, the first device of FIG. 13 may correspond to the second wireless device 200 of FIG. 16 to be described later, and the second device of FIG. 13 may correspond to the first wireless device 100 of FIG. 16 to be described later.

In step S1310, the first device according to an embodiment may transmit, to at least one device, first sidelink control information (SCI) through at least one physical sidelink control channel (PSCCH).

In step S1320, the first device according to an embodiment may transmit, to the at least one device, second SCI different from the first SCI and data through at least one physical sidelink shared channel (PSSCH) related to the at least one PSCCH.

In step S1330, the first device according to an embodiment may determine a plurality of PSFCH resources for receiving a plurality of sidelink hybrid automatic repeat request (HARQ) feedbacks related to the data, based on at least one slot index and at least one sub-channel index related to the at least one PSSCH.

In step S1340, the first device according to an embodiment may receive, from the at least one device, at least one sidelink HARQ feedback related to the data, based on at least one PSFCH resource among the plurality of PSFCH resources.

In step S1350, the first device according to an embodiment may determine to reselect a sidelink transmission resource related to the at least one PSCCH or the at least one PSSCH, based on that a ratio of a total number of bits related to acknowledgement (ACK) to a total number of bits related to the plurality of sidelink HARQ feedbacks is less than or equal to a threshold.

In an embodiment, the threshold may be pre-configured for each resource pool, pre-configured for each priority related to the data, pre-configured for each service type, pre-configured for each congestion level, or pre-configured for each Quality of Service (QoS) parameter.

The first device according to an embodiment may retransmit the data to the at least one device based on a sidelink reselection resource determined by reselecting the sidelink transmission resource.

The first device according to an embodiment may perform sidelink reception or wireless reception on a partial resource among the sidelink transmission resource or candidate resources for determining the sidelink transmission resource.

In an embodiment, the partial resource may be determined by the first device.

In an embodiment, the sidelink reception or the wireless reception performed on the partial resource may be performed N times within M sidelink resource periods, and M and N are positive integers.

In an embodiment, the M or the N may be pre-configured for each resource pool, pre-configured for each priority related to the data, pre-configured for each service type, pre-configured for each congestion level, or pre-configured for each QoS parameter.

In an embodiment, information on the sidelink transmission resource may be transmitted to the at least one device through a resource other than the sidelink transmission resource.

In an embodiment, a slot location of a first PSCCH or a first PSSCH related to the first PSCCH with respect to a starting time of a first sidelink resource period may be a first slot location, and a slot location of a second PSCCH or a second PSSCH related to the second PSCCH with respect to a starting time of a second sidelink resource period may be a second slot location, and a starting sub-channel of the first PSSCH may be a first sub-channel, and a starting sub-channel of the second PSSCH may be a second sub-channel.

In an embodiment, a hopping pattern for determining at least one of the first slot location, the second slot location, the first sub-channel, or the second sub-channel may be determined or changed by the first device for each sidelink resource period.

In an embodiment, a hopping pattern for determining at least one of the first slot location, the second slot location, the first sub-channel, and the second sub-channel may be determined based on a parameter configured for each PSCCH cyclic redundancy check (CRC), for each L1 destination identifier (ID), for each L1 source ID, or for each resource pool.

Based on an embodiment of the present disclosure, a first device adapted to perform sidelink communication may be provided. The first device may comprise: at least one memory storing instructions; at least one transceiver; and at least one processor connected to the at least one memory and the at least one transceiver, w % herein the at least one processor executes the instructions to: control the at least one transceiver to transmit, to at least one device, first sidelink control information (SCI) through at least one physical sidelink control channel (PSCCH); control the at least one transceiver to transmit, to the at least one device, second SCI different from the first SCI and data through at least one physical sidelink shared channel (PSSCH) related to the at least one PSCCH; determine a plurality of PSFCH resources for receiving a plurality of sidelink hybrid automatic repeat request (HARQ) feedbacks related to the data, based on at least one slot index and at least one sub-channel index related to the at least one PSSCH; control the at least one transceiver to receive, from the at least one device, at least one sidelink HARQ feedback related to the data, based on at least one PSFCH resource among the plurality of PSFCH resources; and determine to reselect a sidelink transmission resource related to the at least one PSCCH or the at least one PSSCH, based on that a ratio of a total number of bits related to acknowledgement (ACK) to a total number of bits related to the plurality of sidelink HARQ feedbacks is less than or equal to a threshold.

Based on an embodiment of the present disclosure, a device (or chip(set)) adapted to control a first user equipment (UE) may be provided. The device may comprise: at least one processor; and at least one memory connected to the at least one processor and storing instructions, wherein the at least one processor executes the instructions to: transmit, to at least one device, first sidelink control information (SCI) through at least one physical sidelink control channel (PSCCH); transmit, to the at least one device, second SC different from the first SCI and data through at least one physical sidelink shared channel (PSSCH) related to the at least one PSCCH; determine a plurality of PSFCH resources for receiving a plurality of sidelink hybrid automatic repeat request (HARQ) feedbacks related to the data, based on at least one slot index and at least one sub-channel index related to the at least one PSSCH; receive, from the at least one device, at least one sidelink HARQ feedback related to the data, based on at least one PSFCH resource among the plurality of PSFCH resources; and determine to reselect a sidelink transmission resource related to the at least one PSCCH or the at least one PSSCH, based on that a ratio of a total number of bits related to acknowledgement (ACK) to a total number of bits related to the plurality of sidelink HARQ feedbacks is less than or equal to a threshold.

In an embodiment, the first UE of the embodiment may refer to the first device described throughout the present disclosure. In an embodiment, the at least one processor, the at least one memory and the like in the device for controlling the first UE may be implemented as separate sub-chips, respectively, alternatively, at least two or more components may be implemented through one sub-chip.

Based on an embodiment of the present disclosure, a non-transitory computer-readable storage medium storing instructions may be provided, The non-transitory computer-readable storage medium storing instructions, when executed, may cause a first device to: transmit, to at least one device, first sidelink control information (SCI) through at least one physical sidelink control channel (PSCCH); transmit, to the at least one device, second SCI different from the first SCI and data through at least one physical sidelink shared channel (PSSCH) related to the at least one PSCCH; determine a plurality of PSFCH resources for receiving a plurality of sidelink hybrid automatic repeat request (HARQ) feedbacks related to the data, based on at least one slot index and at least one sub-channel index related to the at least one PSSCH; receive, from the at least one device, at least one sidelink HARQ feedback related to the data, based on at least one PSFCH resource among the plurality of PSFCH resources; and determine to reselect a sidelink transmission resource related to the at least one PSCCH or the at least one PSSCH, based on that a ratio of a total number of bits related to acknowledgement (ACK) to a total number of bits related to the plurality of sidelink HARQ feedbacks is less than or equal to a threshold.

Figure 14:
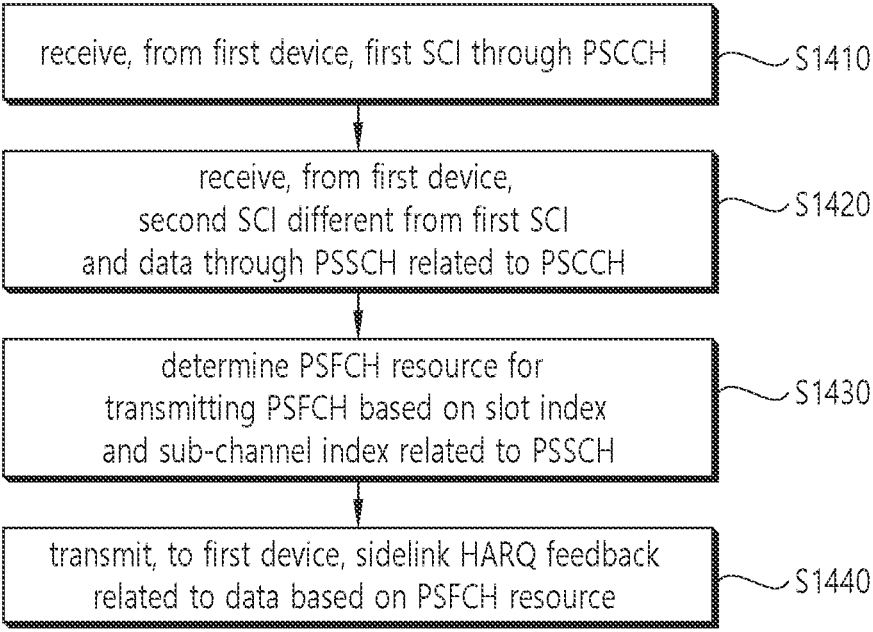
FIG. 14 shows a method for a second device to perform sidelink communication based on an embodiment of the present disclosure.

FIG. 14 shows a method for a second device to perform sidelink communication based on an embodiment of the present disclosure.

The operations disclosed in the flowchart of FIG. 14 may be performed in combination with various embodiments of the present disclosure. In an embodiment, the operations disclosed in the flowchart of FIG. 14 may be performed based on at least one of the devices illustrated in FIGS. 15 to 20. In an embodiment, the second device of FIG. 14 may correspond to the second wireless device 200 of FIG. 16 to be described later, and the first device of FIG. 14 may correspond to the first wireless device 100 of FIG. 16 to be described later. In another embodiment, the second device of FIG. 14 may correspond to the first wireless device 100 of FIG. 16 to be described later, and the first device of FIG. 14 may correspond to the second wireless device 200 of FIG. 16 to be described later.

In step S1410, the second device according to an embodiment may receive, from a first device, first SCI through a PSCCH.

In step S1420, the second device according to an embodiment may receive, from the first device, second SCI different from the first SCI and data through a PSSCH related to the PSCCH.

In step S1430, the second device according to an embodiment may determine a PSFCH resource for transmitting a PSFCH based on a slot index and a sub-channel index related to the PSSCH.

In step S1440, the second device according to an embodiment may transmit, to the first device, sidelink HARQ feedback related to the data based on the PSFCH resource.

In an embodiment, based on that a ratio of a total number of bits related to ACK to a total number of bits related to sidelink HARQ feedbacks expected to be received by the first device is less than or equal to a threshold, a sidelink transmission resource related to the PSCCH or the PSSCH may be reselected by the first device.

In an embodiment, the sidelink HARQ feedback may be one of the sidelink HARQ feedbacks expected to be received by the first device.

In an embodiment, the threshold may be pre-configured for each resource pool, pre-configured for each priority related to the data, pre-configured for each service type, pre-configured for each congestion level, or pre-configured for each Quality of Service (QoS) parameter.

The first device according to an embodiment may retransmit the data to the at least one device based on a sidelink reselection resource determined by reselecting the sidelink transmission resource.

The first device according to an embodiment may perform sidelink reception or wireless reception on a partial resource among the sidelink transmission resource or candidate resources for determining the sidelink transmission resource.

In an embodiment, the partial resource may be determined by the first device.

In an embodiment, the sidelink reception or the wireless reception performed on the partial resource may be performed N times within M sidelink resource periods, and M and N are positive integers.

In an embodiment, the M or the N may be pre-configured for each resource pool, pre-configured for each priority related to the data, pre-configured for each service type, pre-configured for each congestion level, or pre-configured for each QoS parameter.

In an embodiment, information on the sidelink transmission resource may be transmitted to the at least one device through a resource other than the sidelink transmission resource.

In an embodiment, a slot location of a first PSCCH or a first PSSCH related to the first PSCCH with respect to a starting time of a first sidelink resource period may be a first slot location, and a slot location of a second PSCCH or a second PSSCH related to the second PSCCH with respect to a starting time of a second sidelink resource period may be a second slot location, and a starting sub-channel of the first PSSCH may be a first sub-channel, and a starting sub-channel of the second PSSCH may be a second sub-channel.

In an embodiment, a hopping pattern for determining at least one of the first slot location, the second slot location, the first sub-channel, or the second sub-channel may be determined or changed by the first device for each sidelink resource period.

In an embodiment, a hopping pattern for determining at least one of the first slot location, the second slot location, the first sub-channel, and the second sub-channel may be determined based on a parameter configured for each PSCCH cyclic redundancy check (CRC), for each L1 destination identifier (ID), for each L1 source ID, or for each resource pool.

Based on an embodiment of the present disclosure, a second device adapted to perform sidelink communication may be provided. The second device may comprise: at least one memory storing instructions; at least one transceiver; and at least one processor connected to the at least one memory and the at least one transceiver, wherein the at least one processor executes the instructions to: control the at least one transceiver to receive, from a first device, first SCI through a PSCCH; control the at least one transceiver to receive, from the first device, second SCI different from the first SCI and data through a PSSCH related to the PSCCH; determine a PSFCH resource for transmitting a PSFCH based on a slot index and a sub-channel index related to the PSSCH; and control the at least one transceiver to transmit, to the first device, sidelink HARQ feedback related to the data based on the PSFCH resource, wherein, based on that a ratio of a total number of bits related to ACK to a total number of bits related to sidelink HARQ feedbacks expected to be received by the first device is less than or equal to a threshold, a sidelink transmission resource related to the PSCCH or the PSSCH is reselected by the first device, and wherein the sidelink HARQ feedback is one of the sidelink HARQ feedbacks expected to be received by the first device.

Various embodiments of the present disclosure may be combined with each other.

Hereinafter, device(s) to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 15:
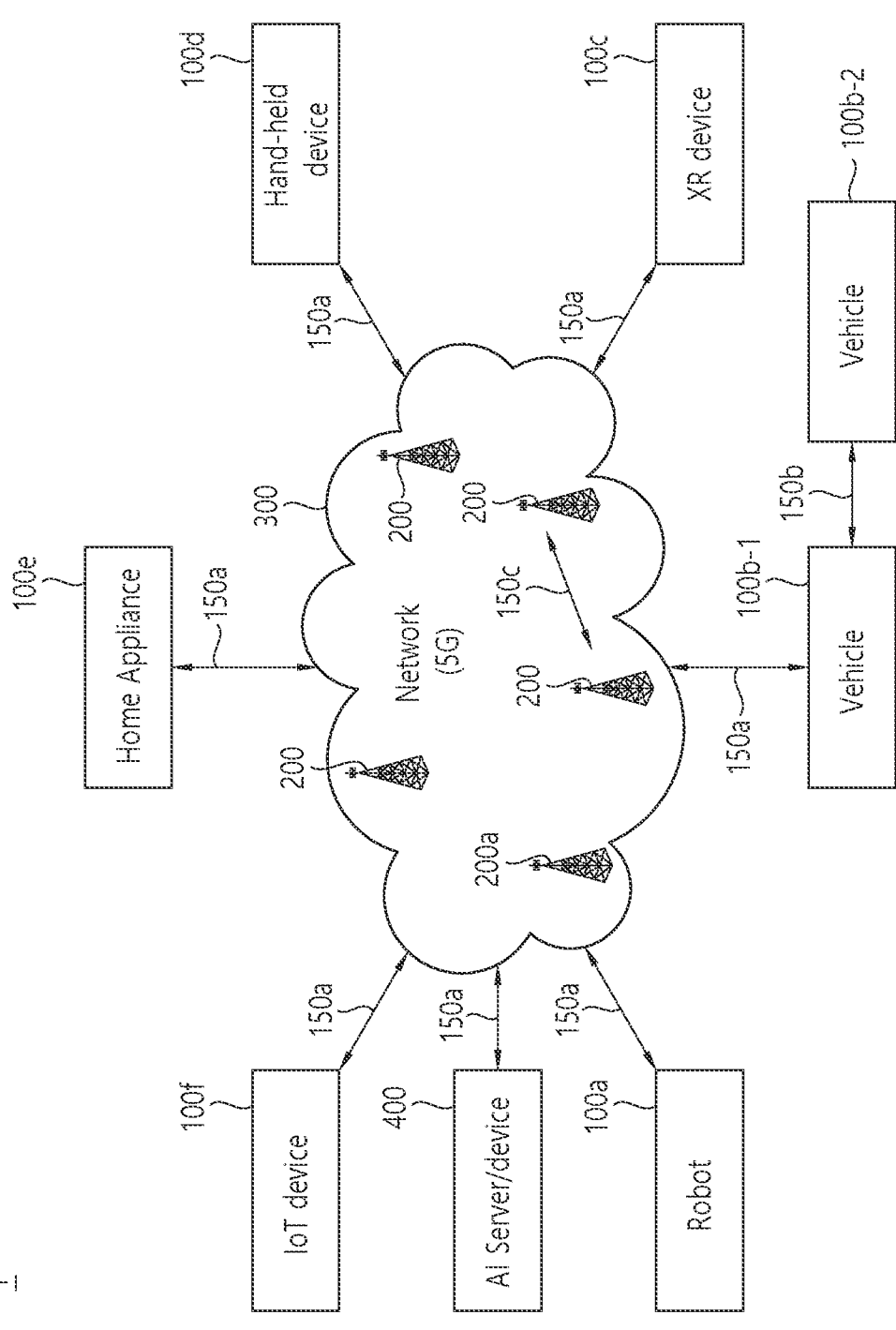
FIG. 15 shows a communication system 1, based on an embodiment of the present disclosure.

FIG. 15 shows a communication system 1, based on an embodiment of the present disclosure.

Referring to FIG. 15, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

Here, wireless communication technology implemented in wireless devices 100a to 100f of the present disclosure may include Narrowband Internet of Things for low-power communication in addition to LTE, NR, and 6G. In this case, for example, NB-IoT technology may be an example of Low Power Wide Area Network (LPWAN) technology and may be implemented as standards such as LTE Cat NB1, and/or LTE Cat NB2, and is not limited to the name described above. Additionally or alternatively, the wireless communication technology implemented in the wireless devices 100a to 100f of the present disclosure may perform communication based on LTE-M technology. In this case, as an example, the LTE-M technology may be an example of the LPWAN and may be called by various names including enhanced Machine Type Communication (eMTC), and the like. For example, the LTE-M technology may be implemented as at least any one of various standards such as 1) LTE CAT 0, 2) LTE Cat M1, 3) LTE Cat M2, 4) LTE non-Bandwidth Limited (non-BL), 5) LTE-MTC, 6) LTE Machine Type Communication, and/or 7) LTE M. and is not limited to the name described above. Additionally or alternatively, the wireless communication technology implemented in the wireless devices 100a to 100f of the present disclosure may include at least one of Bluetooth, Low Power Wide Area Network (LPWAN), and ZigBee considering the low-power communication, and is not limited to the name described above. As an example, the ZigBee technology may generate personal area networks (PAN) related to small/low-power digital communication based on various standards including IEEE 802.15.4, and the like, and may be called by various names.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (JAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 16:
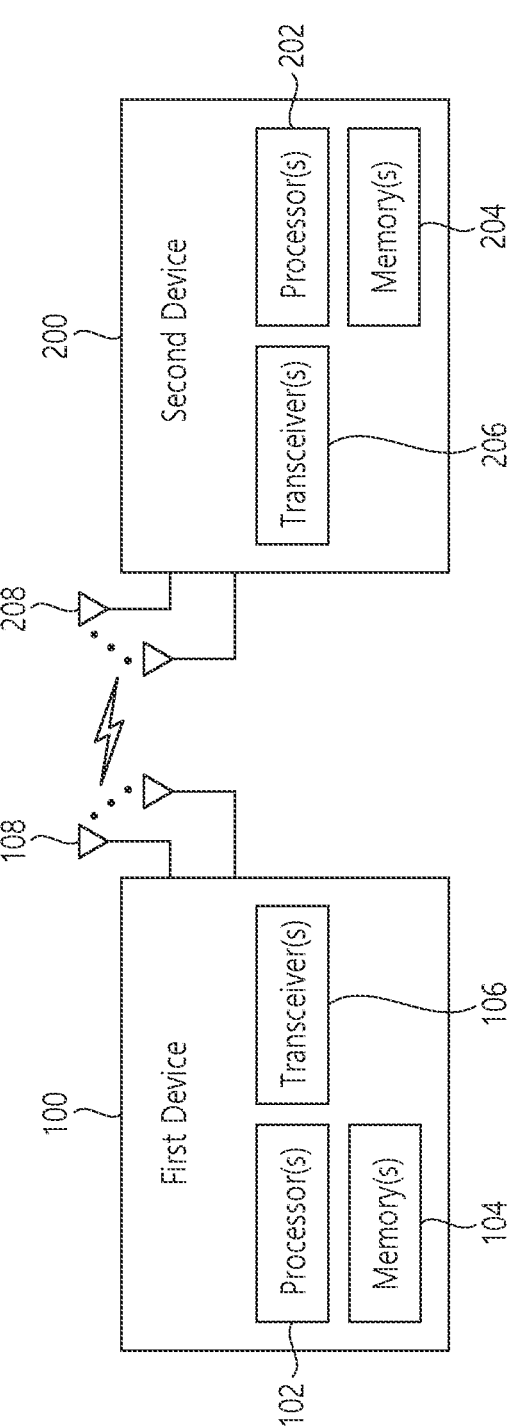
FIG. 16 shows wireless devices, based on an embodiment of the present disclosure.

FIG. 16 shows wireless devices, based on an embodiment of the present disclosure.

Referring to FIG. 16, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 15.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor (s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY. MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 17:
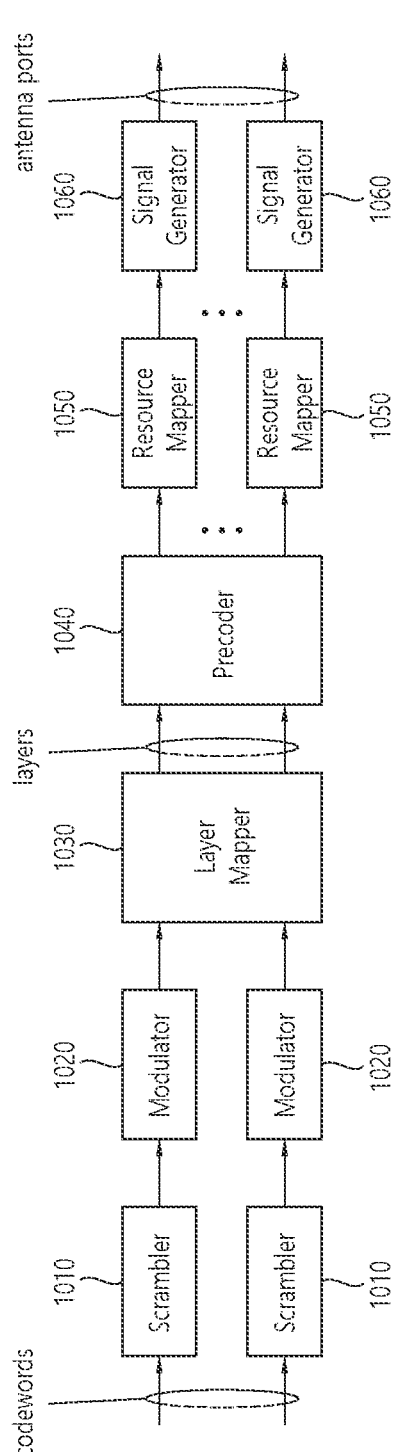
FIG. 17 shows a signal process circuit for a transmission signal, based on an embodiment of the present disclosure.

FIG. 17 shows a signal process circuit for a transmission signal, based on an embodiment of the present disclosure.

Referring to FIG. 17, a signal processing circuit 1000 may include scramblers 1010, modulators 1020, a layer mapper 1030, a precoder 1040, resource mappers 1050, and signal generators 1060. An operation/function of FIG. 17 may be performed, without being limited to, the processors 102 and 202 and/or the transceivers 106 and 206 of FIG. 16. Hardware elements of FIG. 17 may be implemented by the processors 102 and 202 and/or the transceivers 106 and 206 of FIG. 16. For example, blocks 1010 to 1060 may be implemented by the processors 102 and 202 of FIG. 16. Alternatively, the blocks 1010 to 1050 may be implemented by the processors 102 and 202 of FIG. 16 and the block 1060 may be implemented by the transceivers 106 and 206 of FIG. 16.

Codewords may be converted into radio signals via the signal processing circuit 1000 of FIG. 17. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 17. For example, the wireless devices (e.g., 100 and 200 of FIG. 16) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

FIG. 18 shows another example of a wireless device, based on an embodiment of the present disclosure. The wireless device may be implemented in various forms according to a use-case/service (refer to FIG. 15).

Referring to FIG. 18, wireless devices 100 and 200 may correspond to the wireless devices 100 and 200 of FIG. 16 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 16. For example, the transceiver(s) 114 may include the one or more transceivers 106 and 206 and/or the one or more antennas 108 and 208 of FIG. 16. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100*a* of FIG. 15), the vehicles (100*b*-1 and 100*b*-2 of FIG. 15), the XR device (100*c* of FIG. 15), the hand-held device (100*d* of FIG. 15), the home appliance (100*e* of FIG. 15), the IoT device (100*f* of FIG. 15), a digital broadcast terminal, a hologram device, a public safety device, an MTC device, a medicine device, a fintech device (or a finance device), a security device, a climate/environment device, the AI server/device (400 of FIG. 15), the BSs (200 of FIG. 15), a network node, etc. The wireless device may be used in a mobile or fixed place according to a use-example/service.

In FIG. 18, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 18 will be described in detail with reference to the drawings.

Figure 19:
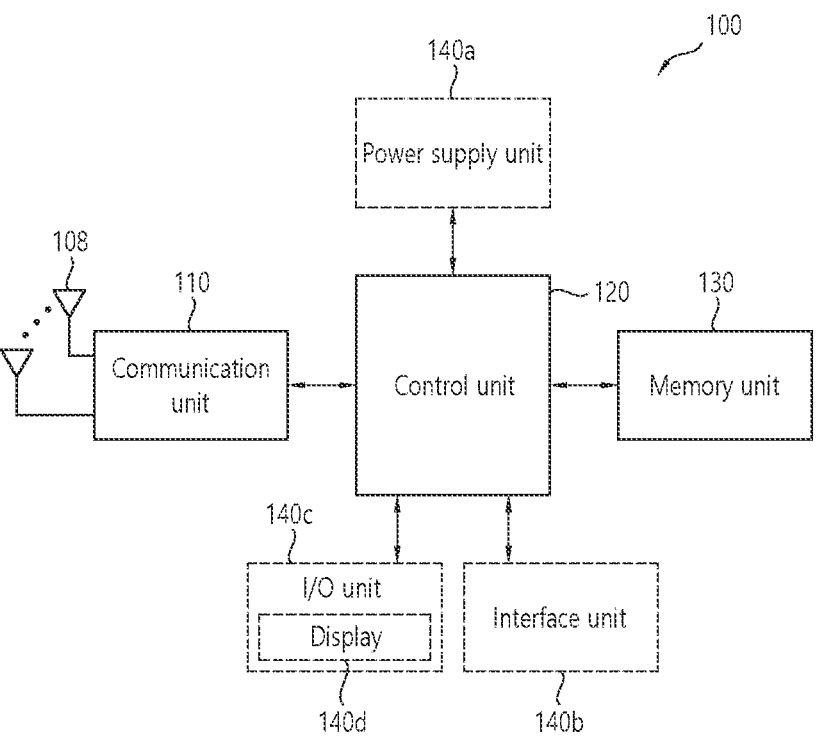
FIG. 19 shows a hand-held device, based on an embodiment of the present disclosure.

FIG. 19 shows a hand-held device, based on an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 19, a hand-held device 100 may include an antenna unit 108, a communication unit 110, a control unit 120, a memory unit 130, a power supply unit 140*a*, an interface unit 140*b*, and an I/O unit 140*c*. The antenna unit 108 may be configured as a part of the communication unit 110. Blocks 110 to 130/140*a* to 140*c* correspond to the blocks 110 to 130/140 of FIG. 18, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140*a* may supply power to the hand-held device 100 and include a wired/wireless charging circuit, a battery, etc. The interface unit 140*b* may support connection of the hand-held device 100 to other external devices. The interface unit 140*b* may include various ports (e.g., an audio I/O port and a video I/O port) for connection with external devices. The I/O unit 140*c* may input or output video information/signals, audio information/signals, data, and/or information input by a user. The I/O unit 140*c* may include a camera, a microphone, a user input unit, a display unit 140*d*, a speaker, and/or a haptic module.

As an example, in the case of data communication, the I/O unit 140*c* may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140*c*.

Figure 20:
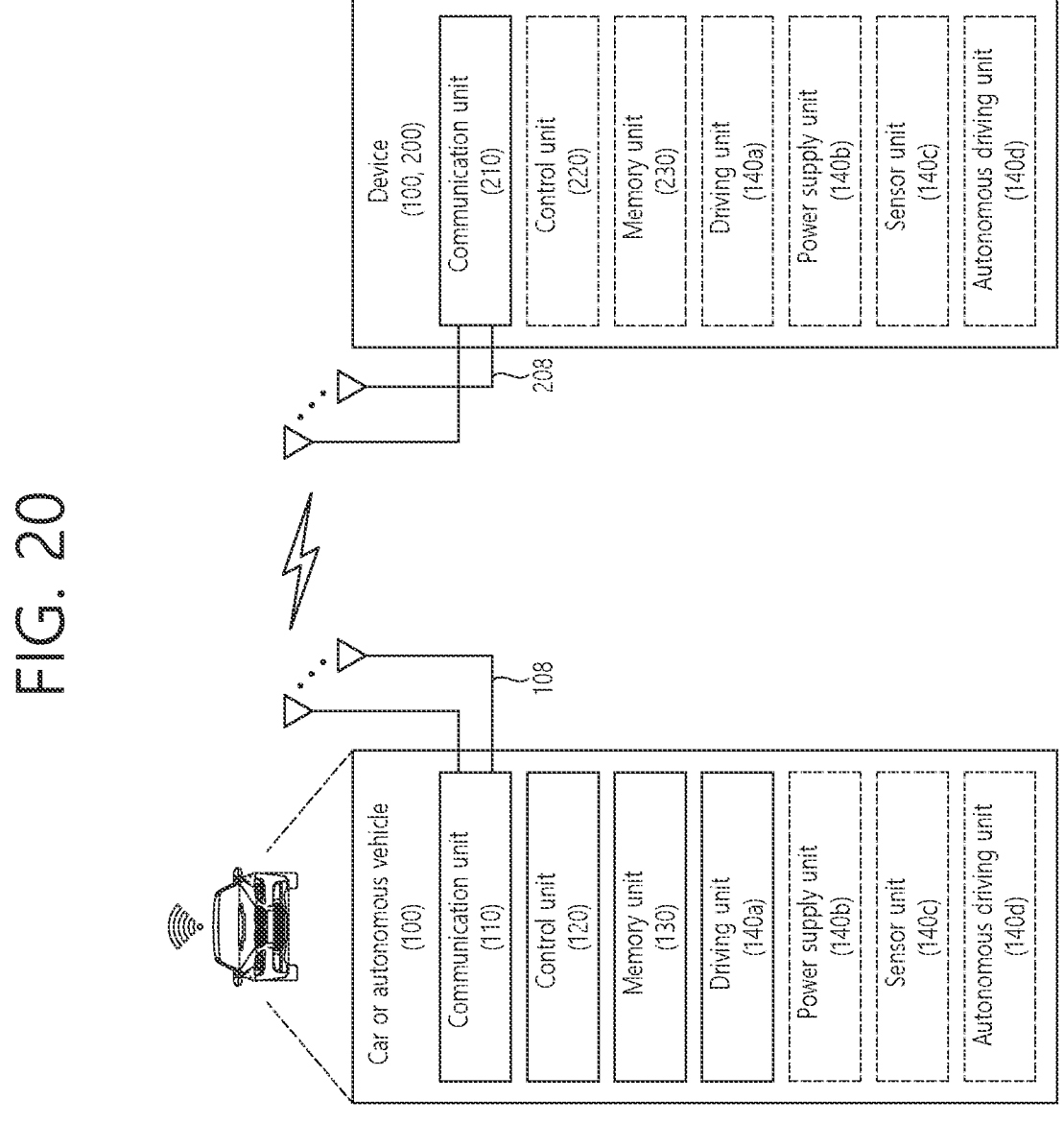
FIG. 20 shows a vehicle or an autonomous vehicle, based on an embodiment of the present disclosure.

FIG. 20 shows a vehicle or an autonomous vehicle, based on an embodiment of the present disclosure. The vehicle or autonomous vehicle may be implemented by a mobile robot, a car, a train, a manned/unmanned Aerial Vehicle (AV), a ship, etc.

Referring to FIG. 20, a vehicle or autonomous vehicle 100 may include an antenna unit 108, a communication unit 110, a control unit 120, a driving unit 140*a*, a power supply unit 140*b*, a sensor unit 140*c*, and an autonomous driving unit 140*d*. The antenna unit 108 may be configured as a part of the communication unit 110. The blocks 110/130/140*a* to 140*d* correspond to the blocks 110/130/140 of FIG. 18, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140*a* may cause the vehicle or the autonomous vehicle 100 to drive on a road. The driving unit 140*a* may include an engine, a motor, a powertrain, a wheel, a brake, a steering device, etc. The power supply unit 140*b* may supply power to the vehicle or the autonomous vehicle 100 and include a wired/wireless charging circuit, a battery, etc. The sensor unit 140*c* may acquire a vehicle state, ambient environment information, user information, etc. The sensor unit 140*c* may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140*d* may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140*d* may generate an autonomous driving path and a driving plan from the obtained data. The control unit 120 may control the driving unit 140*a* such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method, comprising:
transmitting, by a first device to at least one device, control information through a control channel;
transmitting, by the first device to the at least one device, data through a shared channel related to the control channel;
determining, by the first device, a plurality of feedback resources for receiving a plurality of hybrid automatic repeat request (HARQ) feedbacks related to the data, based on at least one slot and at least one sub-channel allocated for the shared channel;
receiving, by the first device from the at least one device, at least one HARQ feedback related to the data, based on at least one feedback resource among the plurality of feedback resources; and
determining, by the first device, to reselect a transmission resource related to the control channel or the shared channel, based on that a ratio of a number of bits related to acknowledgement (ACK) to a number of bits related to the plurality of HARQ feedbacks is less than or equal to a threshold,
wherein information on the transmission resource is transmitted to the at least one device through a resource other than the transmission resource.

2. The method of claim 1, wherein the threshold is pre-configured for each resource pool, pre-configured for each priority related to the data, pre-configured for each service type, pre-configured for each congestion level, or pre-configured for each Quality of Service (QOS) parameter.

3. The method of claim 1, further comprising:
retransmitting the data to the at least one device based on a reselected resource determined by reselecting the transmission resource.

4. The method of claim 1, further comprising:
performing reception on a partial resource among the transmission resource or candidate resources for determining the transmission resource.

5. The method of claim 4, wherein the partial resource is determined by the first device.

6. The method of claim 4, wherein the reception performed on the partial resource is performed N times within M resource periods, and M and N are positive integers.

7. The method of claim 6, wherein the M or the N is pre-configured for each resource pool, pre-configured for each priority related to the data, pre-configured for each service type, pre-configured for each congestion level, or pre-configured for each QoS parameter.

8. The method of claim 1, wherein a slot location of a first control channel or a first shared channel related to the first control channel with respect to a starting time of a first resource period is a first slot location,
wherein a slot location of a second control channel or a second shared channel related to the second control channel with respect to a starting time of a second resource period is a second slot location,
wherein a starting sub-channel of the first shared channel is a first sub-channel, and
wherein a starting sub-channel of the second shared channel is a second sub-channel.

9. The method of claim 8, wherein a hopping pattern for determining at least one of the first slot location, the second slot location, the first sub-channel, or the second sub-channel is determined or changed by the first device for each resource period.

10. The method of claim 8, wherein a hopping pattern for determining at least one of the first slot location, the second slot location, the first sub-channel, and the second sub-channel is determined based on a parameter configured for each control channel cyclic redundancy check (CRC), for each L1 destination identifier (ID), for each L1 source ID, or for each resource pool.

11. A first device, comprising:
at least one transceiver;
at least one processor; and
at least one memory connected to the at least one processor and storing instructions that, based on being executed, cause the first device to perform operations comprising:
transmitting, to at least one device, control information through a control channel;
transmitting, to the at least one device, data through a shared channel related to the control channel;
determining a plurality of feedback resources for receiving a plurality of hybrid automatic repeat request (HARQ) feedbacks related to the data, based on at least one slot and at least one sub-channel allocated for the shared channel;
receiving, from the at least one device, at least one HARQ feedback related to the data, based on at least one feedback resource among the plurality of feedback resources; and
determining to reselect a transmission resource related to the control channel or the shared channel, based on that a ratio of a number of bits related to acknowledgement (ACK) to a number of bits related to the plurality of HARQ feedbacks is less than or equal to a threshold,
wherein information on the transmission resource is transmitted to the at least one device through a resource other than the transmission resource.

12. The first device of claim 11, wherein the threshold is pre-configured for each resource pool, pre-configured for each priority related to the data, pre-configured for each service type, pre-configured for each congestion level, or pre-configured for each Quality of Service (QOS) parameter.

13. The first device of claim 11, wherein the operations further comprise: retransmitting the data to the at least one device based on a reselected resource determined by reselecting the transmission resource.

14. The first device of claim 11, wherein the operations further comprise: performing reception on a partial resource among the transmission resource or candidate resources for determining the transmission resource.

15. The first device of claim 14, wherein the partial resource is determined by the first device.

16. A processing device, the comprising:

at least one processor; and at least one memory connected to the at least one processor and storing instructions that, based on being executed, perform operations comprising:

transmitting, to at least one device, control information through a control channel;

transmitting, to the at least one device, data through a shared channel related to the control channel;

determining a plurality of feedback resources for receiving a plurality of hybrid automatic repeat request (HARQ) feedbacks related to the data, based on at least one slot and at least one sub-channel allocated for the shared channel;

receiving, from the at least one device, at least one HARQ feedback related to the data, based on at least one feedback resource among the plurality of feedback resources; and determining to reselect a transmission resource related to the control channel or the shared channel, based on that a ratio of a number of bits related to acknowledgement (ACK) to a number of bits related to the plurality of HARQ feedbacks is less than or equal to a threshold, wherein information on the transmission resource is transmitted to the at least one device through a resource other than the transmission resource.

17. The processing device of claim 16, wherein the threshold is pre-configured for each resource pool, pre-configured for each priority related to the data, pre-configured for each service type, pre-configured for each congestion level, or pre-configured for each Quality of Service (QOS) parameter.

18. The processing device of claim 16, wherein the operations further comprise: retransmitting the data to the at least one device based on a reselected resource determined by reselecting the sidelink transmission resource.

19. The processing device of claim 16, wherein the operations further comprise: performing reception on a partial resource among the transmission resource or candidate resources for determining the transmission resource.

* * * * *